(12) United States Patent
Balili et al.

(10) Patent No.: US 9,400,173 B2
(45) Date of Patent: Jul. 26, 2016

(54) TRANSLATABLE MEDIA STACK HEIGHT SENSOR ASSEMBLY

(71) Applicant: Lexmark International, Inc., Lexington, KY (US)

(72) Inventors: Dale Bryan Cuesta Balili, Danao (PH); Michael Villanueva Caneza, Cordova (PH); Roel Firmeza Pantonial, Cebu (PH); Jake Tia Pia, Liloan (PH); Marvin Aliviado Rodriguez, Talisay (PH); Donald Norman Spitz, Lexington, KY (US)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 482 days.

(21) Appl. No.: 14/055,377

(22) Filed: Oct. 16, 2013

(65) Prior Publication Data

US 2015/0102085 A1   Apr. 16, 2015

(51) Int. Cl.
*B65H 37/04* (2006.01)
*G01B 11/06* (2006.01)
*B65H 7/20* (2006.01)
*B65H 43/00* (2006.01)

(Continued)

(52) U.S. Cl.
CPC .............. *G01B 11/0608* (2013.01); *B65H 7/02* (2013.01); *B65H 7/20* (2013.01); *B65H 37/04* (2013.01); *B65H 43/00* (2013.01); *B65H 43/06* (2013.01); *B65H 2220/02* (2013.01); *B65H 2403/41* (2013.01); *B65H 2403/5331* (2013.01); *B65H 2511/13* (2013.01); *B65H 2511/152* (2013.01); *B65H 2511/222* (2013.01); *B65H 2511/30* (2013.01); *B65H 2511/526* (2013.01); *B65H 2513/53* (2013.01); *B65H 2515/112* (2013.01); *B65H 2515/312* (2013.01); *B65H 2553/612* (2013.01); *B65H 2555/26* (2013.01); *B65H 2801/27* (2013.01); *G03G 2215/00911* (2013.01)

(58) Field of Classification Search
CPC .......... B65H 37/04; B65H 7/20; B65H 43/00; B65H 7/02; B65H 43/06; B65H 2403/41; B65H 2403/5331; G03G 15/6541; G03G 15/00; G01B 11/0608
USPC ........... 270/58.09; 399/401; 271/258.01, 262, 271/258.03, 258.04, 265.01, 265.04
See application file for complete search history.

(56) References Cited

U.S. PATENT DOCUMENTS

| 4,421,264 A | * | 12/1983 | Arter ..................... B27F 7/17 227/2 |
| 5,622,364 A | * | 4/1997 | Dutton ................... B65H 7/00 271/110 |

(Continued)

*Primary Examiner* — Patrick Mackey
(74) *Attorney, Agent, or Firm* — John Victor Pezdek

(57) ABSTRACT

A translatable media height sensor assembly for measuring a media stack in an imaging forming device. The assembly includes a support and drive and insertion assemblies mounted thereon. Insertion assembly includes a translatable plunger having mounted thereon a sensor and a translatable probe. At a home position, the sensor is actuated by a flag on the support placing sensor output in a first state. During measurement, drive assembly translates insertion assembly toward a media stack and the sensor output changes to a second state and a counter is started. The probe initially encounters the media stack and stops while plunger continues to translate. As the plunger reaches the media stack, the probe engages the sensor causing the sensor output to again change state and stops the counter. The insertion assembly retracts back to the home position where the flag actuates the sensor causing the sensor output to change state.

21 Claims, 17 Drawing Sheets

(51) Int. Cl.
  *B65H 7/02*   (2006.01)
  *B65H 43/06*  (2006.01)

(56) References Cited

U.S. PATENT DOCUMENTS

| | | | | |
|---|---|---|---|---|
| 6,216,935 B1 * | 4/2001 | Oussani, Jr. | ............ | B25C 5/0228 |
| | | | | 227/131 |
| 7,198,265 B2 * | 4/2007 | Chelvayohan | ............ | B65H 7/02 |
| | | | | 271/10.02 |
| 7,354,037 B2 * | 4/2008 | Olson | ............ | B27F 7/19 |
| | | | | 227/111 |
| 7,374,163 B2 * | 5/2008 | Cook | ............ | B65H 1/00 |
| | | | | 271/145 |
| 7,413,177 B2 * | 8/2008 | Mori | ............ | B65H 39/11 |
| | | | | 270/58.04 |
| 8,495,821 B2 * | 7/2013 | Wang | ............ | B65H 7/02 |
| | | | | 270/58.09 |
| 8,870,175 B2 * | 10/2014 | Gamo | ............ | B65H 39/00 |
| | | | | 270/58.09 |
| 2004/0108644 A1 * | 6/2004 | Obregon | ............ | B42C 1/125 |
| | | | | 270/58.09 |
| 2015/0102548 A1 * | 4/2015 | Balili | ............ | B65H 31/10 |
| | | | | 270/58.09 |
| 2015/0185373 A1 * | 7/2015 | Hu | ............ | G02B 5/0866 |
| | | | | 428/332 |

* cited by examiner

TABLE 1

| SHEETS | Media Type (number of half-steps mean actual) | | | |
|---|---|---|---|---|
| | 110 lb | 90 lb | 32 lb | 20 lb |
| 0 | 68 | | | |
| 10 | 59 | 61 | 64 | 64 |
| 20 | 50 | 54 | 58 | 62 |
| 30 | 48 | 50 | 52 | 54 |
| 40 | 41 | 45 | 50 | 52 |
| 50 | 36 | 37 | 49 | 50 |

TABLE 2

| SHEETS | Media Weight (number of quarter steps mean from half-step) | | | |
|---|---|---|---|---|
| | 110 lb | 90 lb | 32 lb | 20 lb |
| 0 | 138 | | | |
| 10 | 118 | 122 | 128 | 128 |
| 20 | 100 | 108 | 116 | 124 |
| 30 | 96 | 100 | 104 | 108 |
| 40 | 82 | 90 | 100 | 104 |
| 50 | 72 | 74 | 98 | 100 |

TABLE 3

| SHEETS | Media Weight (number of eighth steps mean from half-step) | | | |
|---|---|---|---|---|
| | 110 lb | 90 lb | 32 lb | 20 lb |
| 0 | 276 | | | |
| 10 | 236 | 244 | 256 | 256 |
| 20 | 200 | 216 | 232 | 248 |
| 30 | 192 | 200 | 208 | 216 |
| 40 | 164 | 180 | 200 | 208 |
| 50 | 144 | 148 | 196 | 200 |

TABLE 4

| SHEETS | Media Type (number of sixteenth-steps mean from half-step) | | | |
|---|---|---|---|---|
| | 110 lb | 90 lb | 32 lb | 20 lb |
| 0 | 552 | | | |
| 10 | 472 | 488 | 512 | 512 |
| 20 | 400 | 432 | 464 | 496 |
| 30 | 384 | 400 | 416 | 432 |
| 40 | 328 | 360 | 400 | 416 |
| 50 | 288 | 296 | 392 | 400 |

FIGURE 14

TRANSLATABLE MEDIA STACK HEIGHT SENSOR ASSEMBLY

CROSS REFERENCES TO RELATED APPLICATIONS

This patent application is related to U.S. patent application Ser. No. 14/055,866, filed Oct. 16, 2013, entitled "REDUCED COMPONENT TRANSLATABLE MEDIA STACK HEIGHT SENSOR ASSEMBLY", and to U.S. patent application Ser. No. 14/055,875, filed Oct. 16, 2013, entitled "METHOD FOR MEASURING MEDIA STACK HEIGHT USING A TRANSLATABLE HEIGHT SENSOR"; all assigned to the assignee of the present application.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Disclosure

The present disclosure relates generally to media sensors used in imaging systems, and more particularly to a media stack height sensor for a finisher having a stapler.

2. Description of the Related Art

When stapling sheets of media that have been printed, the height of the media must not exceed a certain amount to avoid damaging or jamming the stapler head. In prior art staplers, height measurement was done by the use of a rotating link driven by a solenoid. When no media sheets were present, the end of the rotating link would be in its lowest position and a flag mounted thereon and moved by the link would interrupt an optical beam sensor. As media sheets to be stapled are fed into the staging area, the media sheets would raise the end of the link, and, when the number of media sheets exceeded a predetermined maximum height, the link rotates to a position where the flag no longer interrupts the optical beam sensor signaling that the maximum capacity for the stapler has been reached. This system had several limitations including a large stack up tolerance due to the sensor to link to solenoid connection, delays in operation of the solenoid and no capability to determine the actual number of media sheets to be stapled. Thus it would be advantageous to have a stack height sensor assembly that has minimal tolerance stack up, eliminates the uncertainty in the operation of the solenoid and enables measurement of the actual number of media sheets to be stapled.

SUMMARY

Disclosed is a stack height sensor assembly for determining a media stack height in an image forming device. The stack height sensor assembly comprises: a support having a first arm depending therefrom forming a stationary actuating member, the support mountable adjacent to a media staging area in the image forming device; a drive assembly mounted on the support and consisting of a reversible motor operably connectable to a controller in the image forming device, the motor having a drive gear on an output shaft thereof; and an insertion assembly translatably mounted to the support, the insertion assembly having a home position adjacent the first arm. The insertion assembly consists of: a plunger translatably mounted to the support having a top end adjacent the first arm and a bottom end, the plunger in operable engagement with the drive gear; a sensor mounted on the top end of the plunger having an output signal that changes to a first state and to a second state when the sensor is actuated and deactuated, respectively, the output signal operably connectable to the controller; a probe translatably mounted to the plunger, the probe having a top end and a bottom end; and a biasing member connected to the probe and to the plunger wherein the probe is biased such that a portion of the probe at the bottom end thereof extends a predefined extension distance below the bottom end of the plunger.

With the support mounted adjacent to the media staging area, the sensor and motor being operably connected to the controller and the insertion assembly in the home position, the stationary member actuates the sensor causing the output signal to be in the first state. Starting the motor by the controller for rotation in a first direction translates and extends the insertion assembly away from the home position and the stationary actuating member causing the output signal of the sensor to change to the second state. On continued extension the bottom of the probe initially contacts one of a top of a stack of media when present in the media staging area and a surface of the media staging area, thereafter, the plunger and sensor continue to extend until the bottom ends of both the plunger and probe contact one of the top of the stack of media and the surface of the media staging area and the top end of the probe actuates the sensor with the output signal of the sensor changing to the first state. With the insertion assembly being extended, energizing the motor by the controller to rotate in a second direction translates and retracts the insertion assembly toward the home position with the bottom end of the plunger initially being retracted while the biasing member holds the bottom end of the probe in contact with one of the top of the stack of media and the surface of the media staging area until the distance between the bottom end of the plunger and one of the top of the stack of media in the media staging area and the surface of the media staging area equals the predefined extension distance at which point the top end of the probe deactuates the sensor and causing the output signal of the sensor to change to the second state. When the plunger returns to the home position, the stationary actuating member actuates the sensor causing the output signal of the sensor to change to the first state.

BRIEF DESCRIPTION OF THE DRAWINGS

The above-mentioned and other features and advantages of the various disclosed embodiments, and the manner of attaining them, will become more apparent and will be better understood by reference to the accompanying drawings:

FIG. 7A shows the home position, FIG. 7B shows an intermediate position during a measurement cycle and FIG. 7C shows the stack height assembly at a measurement location for a given media stack.

FIG. 10A shows the home position, FIG. 7B shows an intermediate position during a measurement cycle and FIG. 7C shows the stack height assembly at a measurement location for a given media stack.

FIG. 14 provides four tables showing counts to stack heights of zero, ten, twenty, thirty, forty and fifty sheets of four different weights of media.

DETAILED DESCRIPTION

Figure 1:
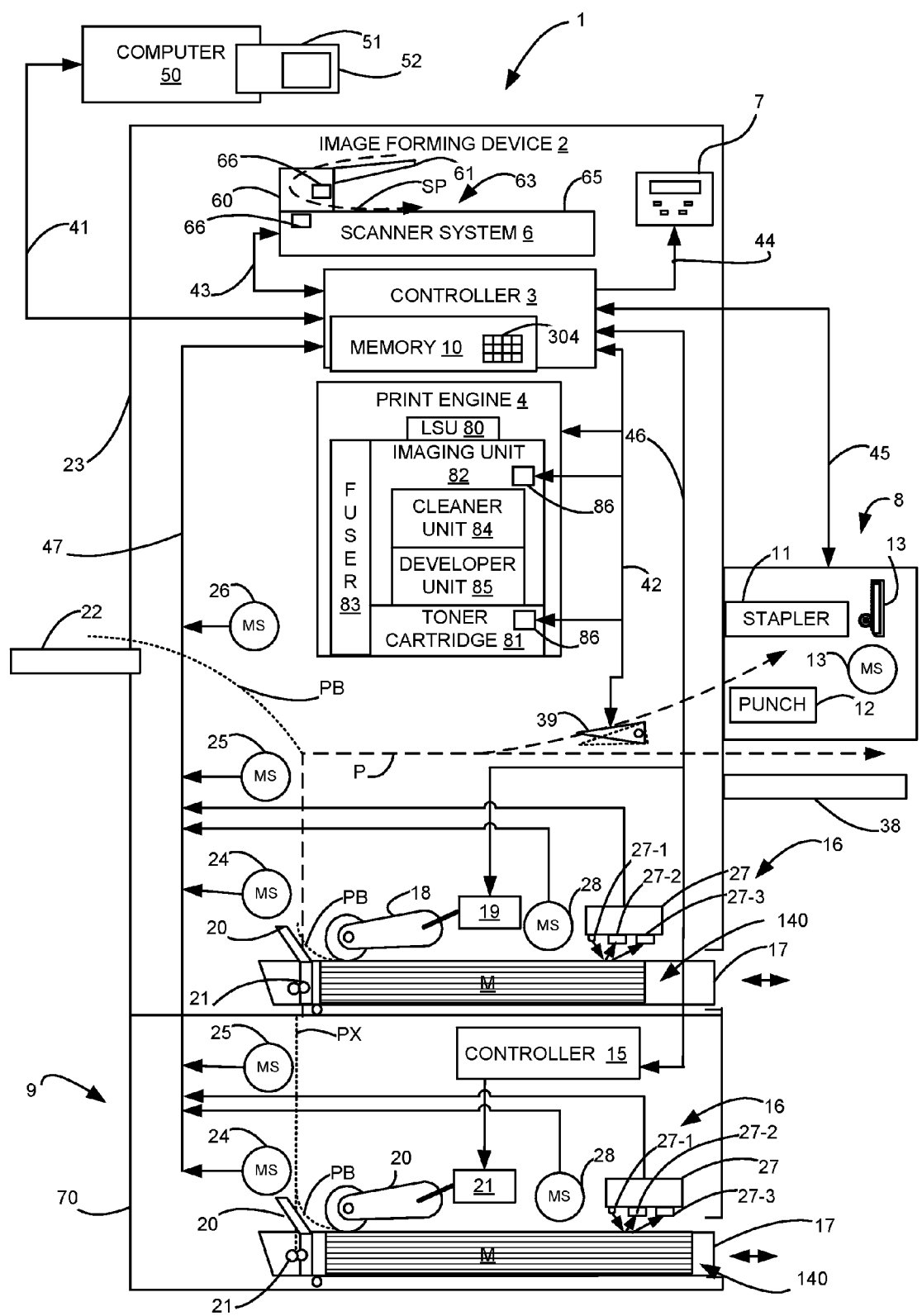
FIG. 1 is a schematic view of an imaging system according to one example embodiment.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting. As used herein, the terms "having", "containing", "including", "comprising", and the like are open ended terms that indicate the presence of stated elements or features, but do not preclude additional elements or features. The articles "a", "an" and "the" are intended to include the plural as well as the singular, unless the context clearly indicates otherwise. The use of "including," "comprising," or "having" and variations thereof herein is meant to encompass the items listed thereafter and equivalents thereof as well as additional items.

Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Spatially relative terms such as "top", "bottom", "front", "back", "rear" and "side" "under", "below", "lower", "over", "upper", "up", "down" and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

In addition, it should be understood that embodiments of the present disclosure include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software. As such, it should be noted that a plurality of hardware and software-based devices, as well as a plurality of different structural components may be utilized to implement the invention. Furthermore, and as described in subsequent paragraphs, the specific mechanical configurations illustrated in the drawings are intended to exemplify embodiments of the present disclosure and that other alternative mechanical configurations are possible.

It will be further understood that each block of the diagrams, and combinations of blocks in the diagrams, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus may create means for implementing the functionality of each block or combinations of blocks in the diagrams discussed in detail in the descriptions below. These computer program instructions may also be stored in a non-transitory, tangible, computer readable storage medium that may direct a computer or other programmable data processing apparatus to function in a particular manner, such that the instructions stored in the computer readable storage medium may produce an article of manufacture including an instruction means that implements the function specified in the block or blocks. Computer readable storage medium includes, for example, disks, CD-ROMS, Flash ROMS, nonvolatile ROM and RAM. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus implement the functions specified in the block or blocks. Output of the computer program instructions, such as the process models and the combined process models, as will be described in greater detail below, may be displayed in a user interface or computer display of the computer or other programmable apparatus that implements the functions or the computer program instructions.

As used herein, the term "communication link" is used to generally refer to structure that facilitates electronic communication between multiple components, and may operate using wired or wireless technology. While several communication links are shown, it is understood that a single communication link may serve the same functions as the multiple communications link that are illustrated.

The term "image" as used herein encompasses any printed or electronic form of text, graphics, or a combination thereof "Media" or "media sheet" refers to a material that receives a printed image or, with a document to be scanned, a material containing a printed image. As used herein, the term "media width" refers to the dimension of the media that is transverse to the direction of the media path. The term media length refers to the dimension of the media that is aligned to the direction of the media path. The media is said to move along the media path and the media path extensions from an upstream location to a downstream location as it moves from the media trays to the output area of the image forming apparatus. For each option tray, the top of the option tray is downstream from the bottom of the option tray. Conversely, the bottom of the option tray is upstream from the top of the option tray. As used herein, the leading edge of the media is that edge which first enters the media path and the trailing edge of the media is that edge that last enters the media path. Depending on the orientation of the media in a media tray, the leading/trailing edges may be the short edge of the media or the long edge of the media, in that most media is rectangular. Further relative positional terms are used herein. For example, "superior" means that an element is above another element. Conversely "inferior" means that an element is below or beneath another element. "Media process direction" describes the movement of media within the imaging system as is generally meant to be from an input toward an output of the imaging system 1.

Media is conveyed using pairs of aligned rolls forming media feed nips. The term "nip" is used in the conventional sense to refer to the opening formed between two rolls that are located at about the same point in the media path. The rolls forming the nip may be separated apart, be tangent to each other, or form an interference fit with one another. With this nip type, the axes of the rolls are parallel to one another and are typically, but do not have to be, transverse to the media path. For example, a deskewing nip may be at an acute angle to the media feed path. The term "separated nip" refers to a nip formed between two rolls that are located at different points along the media path and have no common point of tangency with the media path. Again the axes of rotation of the rolls having a separated nip are parallel but are offset from one another along the media path. Nip gap refers to the space between two rolls. Nip gaps may be positive, where there is an opening between the two rolls, zero where the two rolls are tangentially touching or negative where there is an interference fit between the two rolls.

With respect to media, the term "output" as used herein encompasses media produced from any printing device such as color and black-and-white copiers, color and black-and-white printers, and multifunction devices that incorporate multiple functions such as scanning, copying, and printing capabilities in one device. Such printing devices may utilize ink jet, dot matrix, dye sublimation, laser, and any other suitable print formats. Output may also be used to refer to media processed by a finisher.

The term "button" as used herein means any component, whether a physical component or graphic user interface icon, that is engaged to initiate an action or event.

Figure 2:
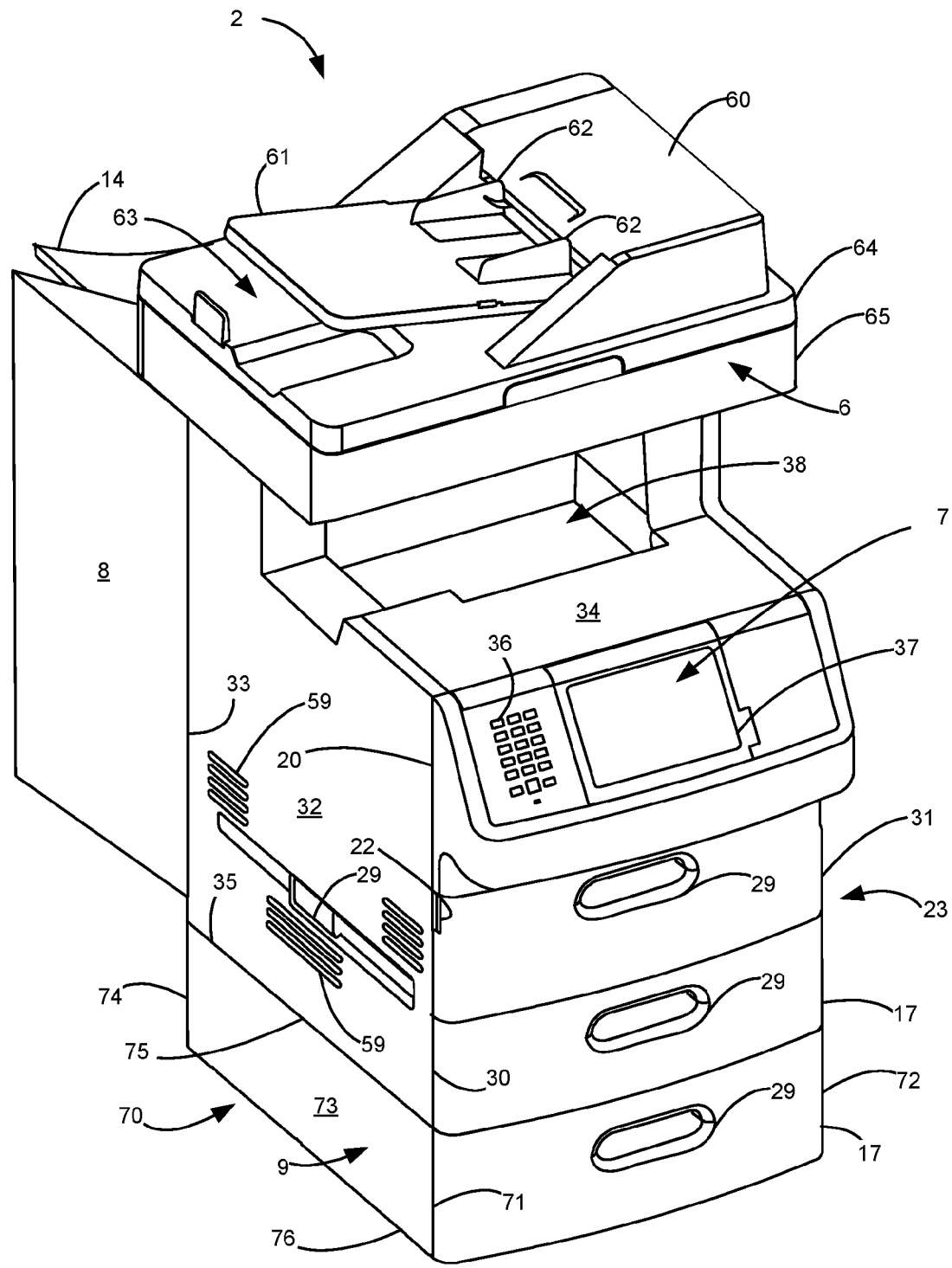
FIG. 2 is an illustration of the image forming device of FIG. 1 having a removable media input tray with an additional option assembly having a removable media input tray along with an attached finishing unit.

Referring now to the drawings and particularly to FIGS. 1-2, there is shown a diagrammatic depiction of an imaging system 1. As shown, imaging system 1 may include an image forming device 2, and an optional computer 50 attached to the image forming device 2. Imaging system 1 may be, for example, a customer imaging system, or alternatively, a development tool used in imaging apparatus design. Image forming device 2 is shown as a multifunction machine that includes a controller 3, a print engine 4, a scanner system 6, a user interface 7, a finisher 8 and/or one or more option assemblies 9.

Controller 3 includes a processor unit and associated memory 10, and may be formed as one or more Application Specific Integrated Circuits (ASICs). Memory 10 may be any volatile or non-volatile memory of combination thereof such as, for example, random access memory (RAM), read only memory (ROM), flash memory and/or non-volatile RAM (NVRAM). Alternatively, memory 10 may be in the form of a separate electronic memory (e.g., RAM, ROM, and/or NVRAM), a hard drive, a CD or DVD drive, or any memory device convenient for use with controller 3. Scanner system 6 may employed scanning technology as is known in the art including for example, CCD scanners, optical reduction scanners or combinations of these and other scanner types. Finisher 8 may include a stapler 11, a punch 12, one or more media sensors 13, various media reference and alignment surfaces and an output area 14 for holding finished media. Image forming device 2 may also be configured to be a printer without scanning.

In FIG. 1, controller 3 is illustrated as being communicatively coupled with computer 50 via communication link 41 using a standard communication protocol, such as for example, universal serial bus (USB), Ethernet or IEEE 802.xx. Controller 3 is illustrated as being communicatively coupled with print engine 4, scanner system 6, user interface 7, and finisher 8, including stapler 11, punch 12 and sensors 13, via communication links 42; 43, 44, 45, respectively. As used herein, the term "communication link" generally refers to a structure that facilitates electronic communication between two components, and may operate using wired or wireless technology. Accordingly, a communication link may be a direct electrical wired connection, a direct wireless connection (e.g., infrared or r.f.), or a network connection (wired or wireless), such as for example, an Ethernet local area network (LAN) or a wireless networking standard, such as IEEE 802.11. Computer 50 includes in its memory 51 a software program including program instructions that function as an imaging driver 52, e.g., printer/scanner driver software, for image forming device 2. Imaging driver 52 is in communication with controller 3 of image forming device 2 via communication link 41. Imaging driver 52 facilitates communication between image forming device 2 and computer 50. One aspect of imaging driver 52 may be, for example, to provide formatted print data to image forming device 2, and more particularly to print engine 4, to print an image. Another aspect of imaging driver 52 may be, for example, to facilitate collection of scanned data from scanner system 6.

In some circumstances, it may be desirable to operate image forming device 2 in a standalone mode. In the standalone mode, image forming device 2 is capable of functioning without computer 50. Accordingly, all or a portion of imaging driver 52, or a similar driver, may be located in controller 3 of image forming device 2 so as to accommodate printing and/or scanning functionality when operating in the standalone mode.

Print engine 4, scanner system 6, user interface 7 and finisher 8 may include firmware maintained in memory 10 which may be performed by controller 3 or another processing element. Controller 3 may be, for example, a combined printer, scanner and finisher controller. Controller 3 serves to process print data and to operate print engine 4 and printing cartridge 5 during printing, as well as to operate scanner system 6 and process data obtained via scanner system 6 for printing or transfer to computer 50. Controller 3 may provide to computer 50 and/or to user interface 7 status indications and messages regarding the media, including scanned media and media to be printed, image forming device 2 itself or any of its subsystems, consumables status, etc. Computer 50 may provide operating commands to image forming device 2. Computer 50 may be located nearby image forming device 2 or remotely connected to image forming device 2 via an internal or external computer network. Image forming device 2 may also be communicatively coupled to other image forming devices.

Print engine 4 is illustrated as including laser scan unit (LSU) 80, a toner cartridge 81, an imaging unit 82, and a fuser 83, all mounted within image forming device 2. Imaging unit 82 and toner cartridge 81 are supported in their operating positions so that toner cartridge 81 is operatively mated to imaging unit 82 while minimizing any unbalanced loading forces by the toner cartridge 81 on imaging unit 82. Imaging unit 82 is removably mounted within image forming device 2 and includes a developer unit 85 that houses a toner sump and a toner delivery system. The toner delivery system includes a toner adder roll that provides toner from the toner sump to a developer roll. A doctor blade provides a metered uniform layer of toner on the surface of the developer roll. Imaging unit 82 also includes a cleaner unit 84 that houses a photoconductive drum and a waste toner removal system. Toner cartridge 81 is also removably mounted in image forming device 2 in a mating relationship with developer unit 85 of imaging unit 82. An exit port on toner cartridge 81 communicates with an entrance port on developer unit 85 allowing toner to be periodically transferred from toner cartridge 81 to resupply the toner sump in developer unit 85. Both imaging unit 82 and toner cartridge 81 are replaceable items for image forming device 2. Imaging unit 82 and toner cartridge 81 may each have a memory device 86 mounted thereon for providing component authentication and information such as type of unit, capacity, toner type, toner loading, pages printed, etc.

The electrophotographic imaging process is well known in the art and, therefore, will be briefly described. During an imaging operation, laser scan unit 80 creates a latent image on the photoconductive drum in cleaner unit 84. Toner is transferred from the toner sump in developer unit 85 to the latent image on the photoconductive drum by the developer roll to create a toned image. The toned image is then transferred to a media sheet received in imaging unit 82 from one of media input trays 17. Next, the toned image is fused to the media sheet in fuser 83 and sent to an output location 38, finisher 8 or a duplexer. Toner remnants are removed from the photoconductive drum by the waste toner removal system housed within cleaner unit 84. As toner is depleted from developer unit 85, toner is transferred from toner cartridge 81 into developer unit 85. Controller 3 provides for the coordination of these activities occurring during the imaging process.

While print engine 4 is illustrated as being an electrophotographic printer, those skilled in the art will recognize that print engine 4 may be, for example, an ink jet printer and one or more ink cartridges or ink tanks or a thermal transfer printer; other printer mechanisms and associated image forming material.

Controller 3 also communicates with a controller 15 in option assembly 9, via communication links 46, provided within each option assembly 9 that is provided in imaging forming device 2. Controller 15 operates various motors housed within option assembly 9 that position media for feeding, feed media from media path branches PB into media path P or media path extensions PX as well as feed media along media path extensions PX. Controllers 3, 15 control the feeding of media along media path P and control the travel of media along media path P and media path extensions PX.

Image forming device 2 and option assembly 9 each also include a media feed system 16 having a removable media input tray 17 for holding media M to be printed or scanned, and a pick mechanism 18, a drive assembly 19 positioned adjacent removable media input trays 17. Each media tray 17 also has a media dam assembly 20 and a feed roll assembly 21. In image forming device 2, pick mechanism 18 is mechanically coupled to drive assembly 19 that is controlled by controller 3 via communication link 46. In option assembly 9, pick mechanism 18 is mechanically coupled to drive assembly 19 that is controlled by controller 3 via controller 15 and communication link 46. In both image forming device 2 and option assembly 9, pick mechanisms 18 are illustrated in a position to drive a topmost media sheet from the media stack M into media dam 20 which directs the picked sheet into media path P or extension PX. As is known, media dam 20 may contain one or more separator rolls and/or separator strips used to prevent shingled feeding of media from media stack M. Feed roll assemblies 21, comprised of two opposed rolls feed media from an inferior unit to a superior unit via a slot provided therein.

In image forming device 2, a media path P (shown in dashed line) is provided from removable media input tray 17 extending through print engine 4 to output area 38, or when needed to finisher 8 or to a duplexing path. Media path P may also have extensions PX and/or branches PB (shown in dotted line) from or to other removable media input trays as described herein such as that shown in option assembly 9. Media path P may include a multipurpose input tray 22 provided on housing 23 of image forming device 2 or incorporated into removable media tray 17 provided in housing 23 and corresponding path branch PB that merges with the media path P within image forming device 2. Along media path P and its extensions PX are provided media position sensors 24, 25 which are used to detect the position of the media, usually the leading and trailing edges of the media, as it moves along the media path P or path extension PX. Media position sensor 24 is located adjacent to the point at which media is picked from each of media trays 17 while media position sensor 25 is positioned further downstream from its respective media tray 17 along media path P or path extension PX. Another media position sensor 26 is shown on path branch PB from multi-purpose media tray 22. Additional media position sensors may be located throughout media path P and a duplex path, when provided, and their positioning is a matter of design choice. Media position sensors, such as an optical interrupter, detect the leading and trailing edges of each sheet of media as it travels along the media path P or path extension PX.

Media type sensors 27 are provided in image forming device 2 and each option assembly 9 to sense the type of media being fed from removable media input trays 18. Media type sensor 27 has a light source 27-1, such as an LED 27-1 and two photoreceptors, 27-2, 27-3. Photoreceptor 27-2 is aligned with the angle of reflection of the light rays from LED 27-1. Photoreceptor 27-2 receives specular light reflected from the surface of the sheet of media and produces an output signal related to amount of specular light reflected. Photoreceptor 27-3 is positioned off of the angle of reflection to receive diffuse light reflected from the surface of the media and produces an output related to the amount of diffused light received. Controller 3 by ratioing the output signals of photoreceptors 27-2, 27-3 at each media type sensor, can determine the type of media.

Media size sensors 28 are provided in image forming device 2 and each option assembly 9 to sense the size of media being feed from removable media input trays 17. To determine media sizes such as Letter, A4, A6, Legal, etc., media size sensors 28 detect the location of adjustable trailing edge media supports and one or both adjustable media side edge media supports provided within removable media input trays 17 as is known in the art. Media sensors 24-28 are shown in communication with controller 3 via communication link 47.

FIG. 2 illustrates an example embodiment of image forming device 2 that includes the removable media input tray 17 that is integrated into a lower portion of the housing 23 of image forming device 2. Illustrated beneath image forming device 2 is one option assembly 9. It will be recognized that additional option assemblies 9 may be provided either inferior to option assembly 9 or between option assembly 9 and housing 23. Housing 23 has a front 30, first and second sides 31, 32, rear 33, top 34 and bottom 35. User interface 7 is illustrated as having a key panel 36 and display 37 and being located on the front 30 of housing 23. Using user interface 7, a user is able to enter commands and generally control the operation of the image forming device 2 including operation of finisher 8. For example, the user may enter commands to switch modes (e.g., color mode, monochrome mode) using key panel 36 or display 37 when it is a touch panel type display, view status indications and messages regarding the media, including scanned media and media to be printed, view thumbnail images of scanned images, view the number of images printed, take the image forming device 2 on/off line to perform periodic maintenance, select stapling and staple positions, select hole punch and hole positions and the like.

A media output area 38 is provided in the top 34. Multipurpose media input tray 22 folds out from the front 30 of housing 23 and may be used for handling envelopes, index cards or other media for which only a small number of media will be printed. Hand grips 29 are provided in several locations on housing 23, such as on sides 31-32, along the top of multipurpose media tray 22, and on the front of removable media input trays 17. Also various ventilation openings, such as vents 59 are provided at locations on first and second sides 31, 32.

Referring to FIGS. 1-2, image forming device 2 is also illustrated as having scanner system 6 including an auto-document feeder (ADF) 60 having an media input tray 61 with media edge guides 62, a center fed media edge guides are illustrated, and a media output area 63 provided on a lid 64 mounted on base 65. Scanner system 6 may include scan bars 66 in both ADF 60 and base 65 to provide for single and duplex scanning of images. Base 65 may also provide a scan platen and function as a flat bed scanner. Media to be scanned is fed from media input tray 61 to output area 63 going past scan bars 66 along scan path SP. Although a separate media input is shown for scanner system 6, it should be recognized that in one form, that media path P may be extended to ADF 60 and then media input trays 17 may hold printed documents to be scanned or such documents may be fed through multipurpose media tray 22 to scanner system 6.

In FIG. 2, finisher 8 is shown mounted to the rear 33 of housing 23. Finisher 8 may include one of stapler 11, punch 12 or both stapler 11 and punch 12. An output area 14 is provided on finisher 8 for storing punched and/or stapled media. Stapler 11 staples two or more printed media sheets together. Stapler 11 is translatable about the edges of the media sheets to be stapled allowing for leading edge, trailing edge, or side edge stapling at one or more locations along such edges. Stapler 11 typically has a capacity to staple together about fifty media sheets of standard 20 pound weight, but this will vary based on the weight (thickness) of the media sheets. One of the sensors 13 in finisher 8 is a stack height sensor assembly provided adjacent stapler 11 to provide to controller 3 the height of the media sheets to be stapled and will be subsequently described in more detail. Stack height is used to determine the amount of force needed to staple the media sheets together. Punch 12 provides one or more holes in printed media sheets, typically adjacent an edge thereof and may also be translatable to provide holes along a leading edge, trailing edge and/or adjacent side edge of the media.

Finisher 8 is illustrated as being in communication with media path P via a gate 39 (see FIG. 1) that is movable between at least two positions (as indicated by the dashed line image). When printed media sheets need to be stapled or hole punched, controller 3 actuates gate 39, via communication link 42, moving gate 39 to a second positioned as indicated by the dashed line image to direct the media sheets to finisher 8. Media not needing a finisher function, would be directed by gate 39 to media output area 38.

Option assembly 9 includes a housing 70 having a front 71, first and second sides 72, 73, rear 74, top 75 and bottom 76. Within housing 70 are feed system 16 with removable media input tray 17, pick mechanism 18, drive mechanism 19, media dam assembly 20 and feed roll assembly 21. Image forming apparatus 2 is at the top of the stack and sits on the top 75 of option assembly 9. Latches and alignment features are provided between adjacent units within the stack. An adjacent unit is either an image forming apparatus 2 or another option assembly 9. Additional option assemblies 9 may be added to the stack between the attached option assembly 9 or below it. As each option assembly 9 is added, an extension PX to the media path P is also added. The media path extension PX within each option assembly 9 is comprised of two branches which eventually merge at a point above their respective housing 70, either, depending on location within the stack, within a superior option assembly 9 or within image forming device 2 itself.

Media sheets M are introduced from removable media input tray 17 and moved along the media path P and or a path extension PX during the image formation process. Each removable media input tray 17 is sized to contain a stack of media sheets M that will receive color and/or monochrome image. When used for feeding media sheets to a scanner, removable media input tray 17 would contain media sheets having images that would be scanned. Each image forming device 2 may include one or more input options for introducing the media sheets. Each removable media input tray 17 may have the same or similar features. Each removable media input tray 17 may be sized to hold the same number of media sheets or may be sized to hold different quantities of media sheets. In some instances, the removable media input tray 17 found in image forming apparatus 2 may hold a lesser, equal or greater quantity of media than a removable media input tray 17 found in an option assembly 9. As illustrated removable media input tray 17 is sized to hold approximately 550 pages of 20 pound media which has a media stack height of about 59 mm and at this stack height would be considered full. For lighter or heavier weight media, the number of pages with this stack height would of course vary depending on the thickness of the media. If additional media were added, removable media input tray 17 would be considered to be overfilled. Typically, removable media input tray 17 in option assembly 9 is insertable into a housing 70 of another option assembly 9, but this is not a requirement or limitation of the design.

Figure 3:
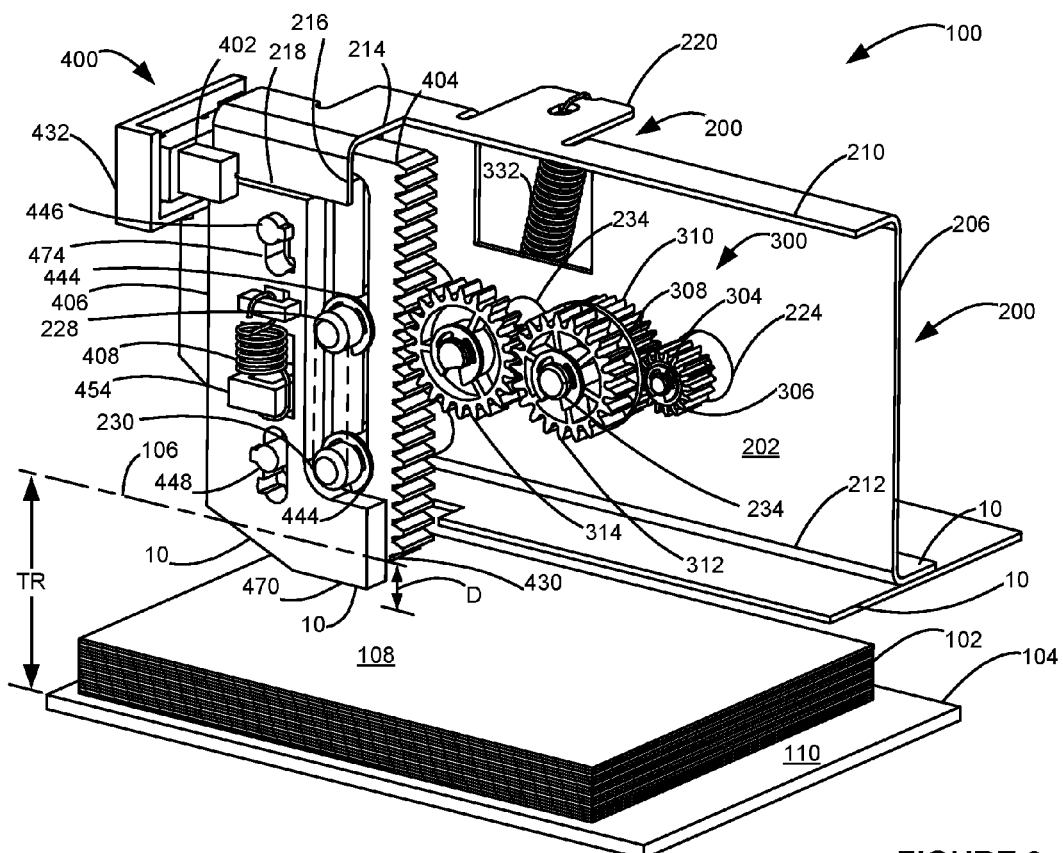
FIG. 3 is a front perspective view of one embodiment of a stack height sensor assembly of the present disclosure.
Figure 4:
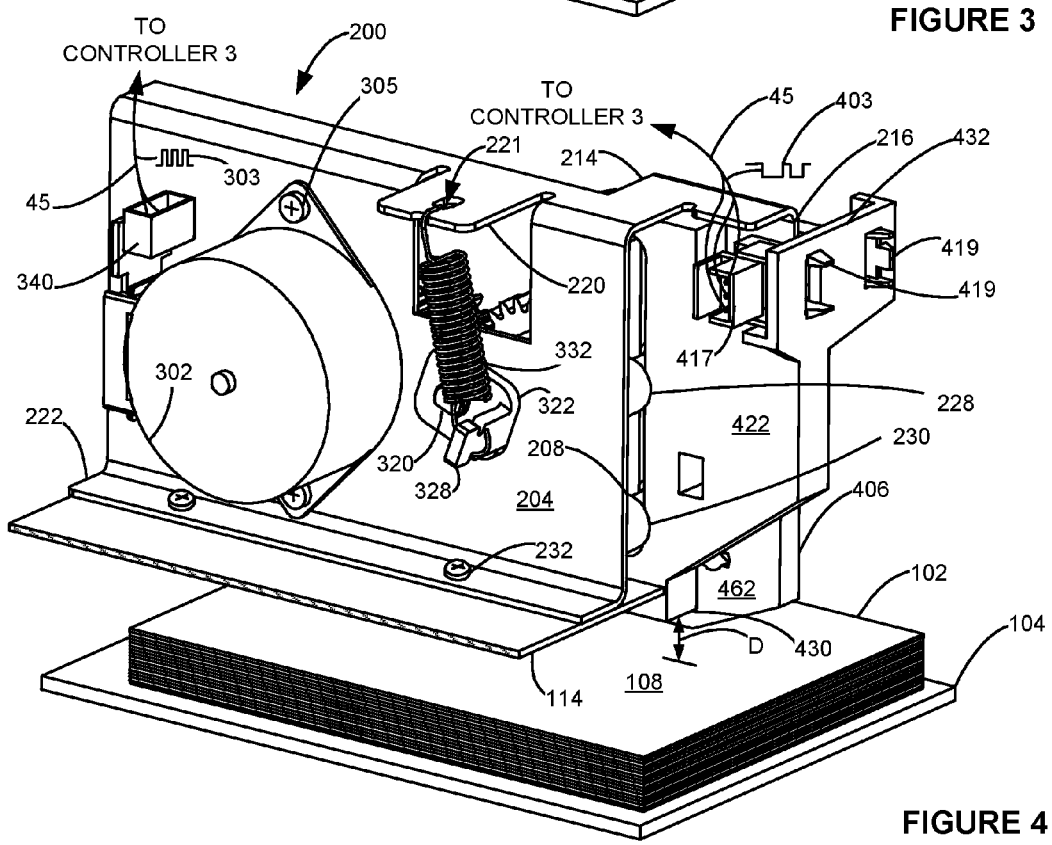
FIG. 4 is a rear perspective view of the stack height sensor assembly shown in FIG. 3.

In FIGS. 3-4, an embodiment one of the sensors 13 in finisher 8—a media stack height sensor assembly 100—is illustrated. Stack height sensor assembly 100 is used to measure the height of a media stack 102 to be stapled in finisher 8 and provides a signal to controller 3 that may be correlated to the height and/or sheet count of the media stack 102 awaiting stapling. Also if the media weight is not known then this signal may be used to provide an indication of media weight based on the stack height for a given media sheet count. In finisher 8, media stack 102 is positioned within a media staging area 104 on its surface 110. Stack height sensor assembly 100 is positioned on support 114 adjacent one of the edges of media stack 102 and, as illustrated, is also positioned above media stack 102.

Stack height sensor assembly 100 includes a support 200 on which is mounted a drive assembly 300 and an insertion assembly 400 operably connected to the drive assembly 300 with each assembly being in communication with controller 3. Support 200 may be a separate piece that is attached to a portion of finisher 8 or be a portion of an existing support 114, such as plate 114 within finisher 8. Insertion assembly 400 is retractably extendible by drive assembly 300 into a media staging area 104 within finisher 8 where the media stack 102 is held and aligned prior to stapling. A sensor 402, mounted on insertion assembly 400 and in electrical communication with controller 3 via communication link 45, a provides a output signal 403 that changes state when insertion assembly 400 is extended from a home position 106 and again changes state when insertion assembly 400 contacts the top 108 of media stack 102 to be stapled. At this point, insertion assembly 400 is retracted and upon returning its home position 106, sensor output signal 403 again changes state signaling its arrival there. Thus the output signal 403 of a single sensor, sensor 402, is used to determine a stack height of media stack 102 and a home position of insertion assembly 400. Drive mechanism 300 is used to extend and retract insertion assembly 400. As illustrated, insertion assembly 400 is translatable from its home position 106 to either a measurement position located at the top 108 of media stack 102 or to a surface 110 of staging area 104 that receives the media sheets.

At controller 3, the time or count between the first two state changes of sensor output signal 403 can be correlated to a stack height and/or media sheet count such as by use of a look up table 112 stored in memory 10 (see FIG. 1). This information may then be used to adjust the stapling force applied by stapler 11 to media stack 102. In one form, default stack heights may be provided in look-up table 112 to cover a range of media weights. However, if media type information is available, such as from user input or with the use of a signal provided by media type sensor 28, correlated stack heights and or media sheet counts based on media type may be provided in look up table 112.

For the illustrated orientation, support 200 has front and rear surfaces 202, 204, first and second sides 206, 208 and a top and a bottom 210, 212, respectively. Depending outwardly from top 210 and/or front surface 202 is first arm 214 having a downwardly depending stationary member, such as stationary flag 216 having a lower edge 218. As illustrated, flag 216 is spaced apart from front surface 202. This may be better seen in FIG. 5. Stationary member 216 will actuate a sensor on insertion assembly 300 when the sensor is at or translated into a home position 106. Depending outwardly from top 210 and/or rear surface 204 is second arm 220 and depending outwardly from bottom 212 is flange 222 used to mount support 200 in finisher 8. One or more openings 224 are also provided in support 200 for mounting of components of drive assembly 300. A pair of vertically aligned posts 228, 230 for supporting insertion assembly 400 depend from front surface 202 adjacent to second side 208. Support 200 is affixed to wall 114 by one or more fasteners 232. One or more mounting bosses 234 are provided on front surface 202 for supporting components of drive assembly 300.

Drive assembly 300 mounts to support 200 and is used to translate insertion assembly 400 during a stack height measurement cycle. Drive assembly 300 includes motor 302 having output shaft 304. Motor gear 306 is mounted on output shaft 304. Motor 302 is in electrical communication with controller 3 via connector 340 that attaches to communication link 45 and receives a motor drive signal 303, such as a pulse train 303, from controller 3. Motor 302 is reversible and, in one form, is a stepper motor. Other forms of reversible motors include a DC motor with a shaft mounted rotary encoder where encoder pulses would be counted, an AC motor with shaft mounted encoder, a BDC motor with encoder, and a BLDC motor with encoder. Motor 302 is illustrated as being mounted on the rear surface 204 of support 200 with fasteners 305, such as screws 305. Shaft 304 extends through an opening 224 with motor gear 306 mounted on the portion of shaft 304 extending outwardly from front surface 202. One or more intermediate gears, such as gear 308 may be rotatably mounted to support 200 via a corresponding boss, such as boss 234. Other forms of attachment may be used as is known in the art and the type of attachment shown should not be considered to be a limitation of the design. The use of one or more intermediate gears is a matter of design choice and their use should not be considered to be a limitation of the design.

As shown, intermediate gear 308 is a compound gear having a first gear portion 310 engaging with motor gear 306 and a second gear portion 312 engaging rack drive gear 314. Rack drive gear 314 engages rack 440 to extend and retract insertion assembly 400. As rack drive gear 314 is driven by motor 302 via gears 306, 308, rack drive gear 314 engages with rack 440 causing insertion assembly 400 to translate between the home position 106 and, at its farthest extent, surface 110 of media staging area 104.

First and second gear portions 310, 312 have the same diameter but first gear portion 310 has a higher number of teeth than second gear portion 312 and acts as a speed reducer. Second gear portion 312 and rack drive gear 314 have approximately the same number or teeth. With this arrangement, the amount of rotation of motor gear 306 will be greater than the corresponding amount of rotation of rack drive gear 314 allowing for better control of the insertion and retraction of insertion assembly 400. In one form motor gear 306 has 17 teeth at a module of 0.5 mm with a pitch circle diameter of 8.5 mm; for intermediate gear 308 first gear portion 310 has 32 teeth and a module of 0.5 mm with a pitch circle diameter of 16 mm and second gear portion 312 has 21 teeth and a module of 0.8 mm with a pitch circle diameter of 16.8 mm; and rack drive gear 314 has 22 teeth at a module of 0.8 mm with a pitch circle diameter of 17.6. The gear ratio from gear 306 to first gear portion 310 is 17/32 or (0.53) while the linear speed ratio from motor gear 306 to second gear portion 312 is 0.95.

Rack drive gear 314 may also be rotatably mounted to front surface 202 of support 200 on a boss 234 in a manner similar to that shown for gear 308. Rack drive gear 314 engages with insertion assembly 400 wherein rotation of gear 314 in a first direction extends insertion assembly 400 and rotation of rack drive gear 314 in a second direction retracts insertion assembly 400. Gear 306 and gears 308, 314 are shown attached to shaft 304 and bosses 234, by use of a spring clip 316. Other forms are rotatably affixing gears 306, 308, 314 to their respective mounts may be used and the manner of attached such as the illustrated use of spring clip 316 to serve this function should not be considered to be a limitation of the design.

Figure 5:
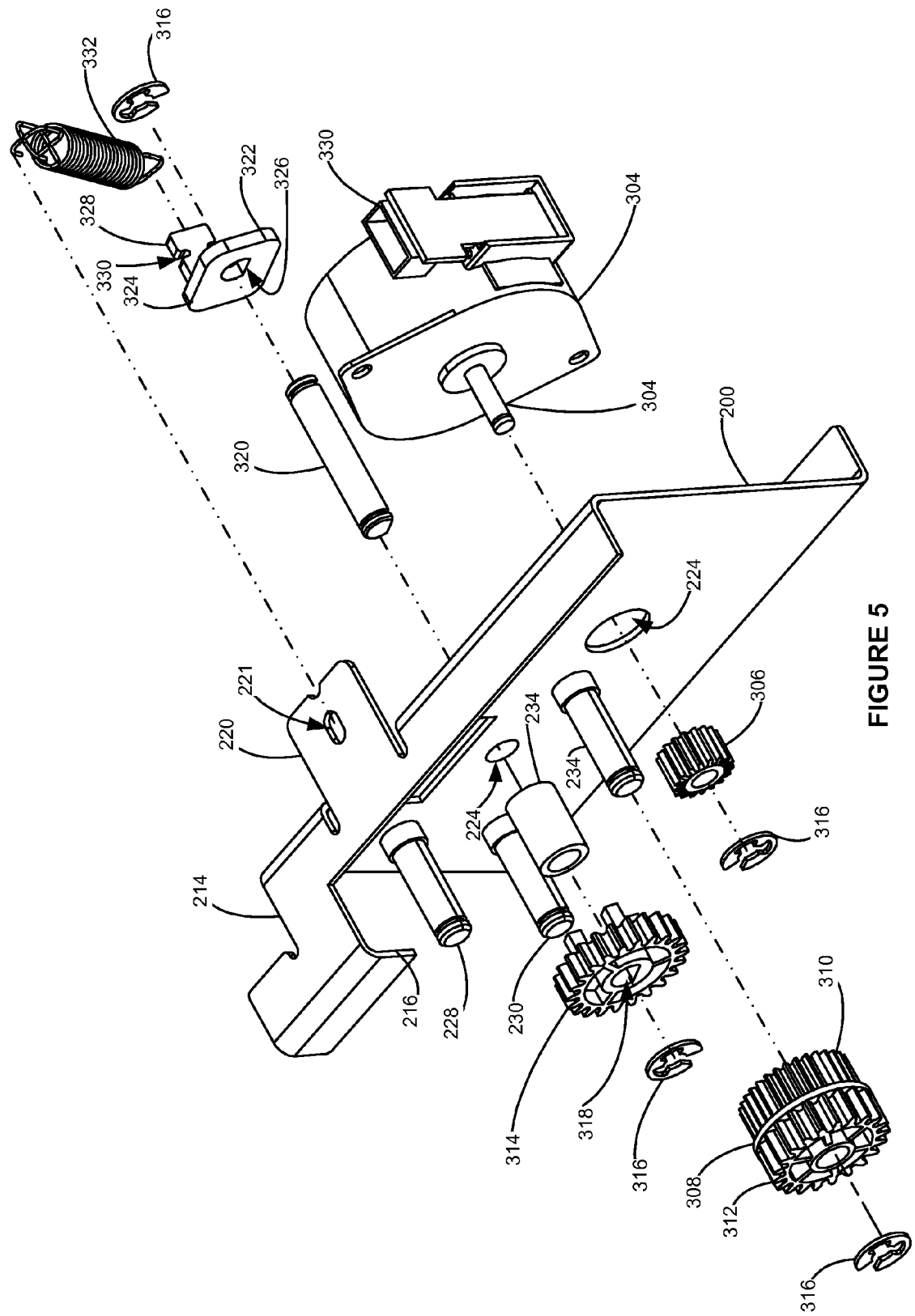
FIG. 5 is an exploded perspective view of a drive assembly portion of the present stack height sensor assembly.

In another form, shown in FIG. 5, rack drive gear 314 has a keyed central opening 318, such as D-shaped central opening 318 and is mounted to shaft 320 that has a correspondingly keyed cross sectional shape, such as the D-shape, that is also rotatably mounted to support 200. Also attached to shaft 320 outboard of rear surface 204 of support 200 is lever or cam 322 also having a corresponding key shaped central opening, such as D shaped central opening 324 sized to receive shaft 320. Lever 322 has a free end 326 radially spaced from shaft 320 at which is located an axially member 328 extending away from rear surface 204. Axial member 328 has a pair of notches 330. Spring clips 316 are attached to each end of shaft 320 to assemble shaft 320, rack gear 314 and lever 322 together and to attach this assembly to support 200.

A biasing member 332, such as spring 332, is attached at its respective ends to notches 330 on member 328 and to second arm 220 at hole 221 therein so that spring 332 is over-centered with respect to the rotational centerline of shaft 320. Because biasing member/spring 332 is in an over-centered arrangement, this allows biasing member 332 to have two stable positions, one when insertion mechanism 400 is retracted in the home position 106 and the other when insertion mechanism 400 is extended. When motor 302 is driven to extend insertion mechanism 400, motor 302 will rotate rack gear 314 which in turn rotates shaft 320 rotating cam 322. The motor force will overcome the force of biasing member 332 extending biasing member 332. After a certain amount of shaft/cam rotation, biasing member 332 moves to its second stable position and instead of providing resistance against rotation of rack drive gear 114, biasing member 332 will now be acting to rotate shaft 320 and rack drive gear 314 in the direction that rack drive gear 314 was rotating. With motor 302 turned off, biasing member 332 acts to push insertion assembly 400 towards the media stack during stack height when insertion assembly 400 is extended, or biasing insertion assembly 400 in its home position when it is retracted and biasing member 332 is in its other stable position. The use of the cam 322 and biasing member 332 allows plunger 404 is act as a hold down clamp for the media stack 102 while plunger 404 is extended.

Insertion assembly 400 includes sensor 402, plunger 404, probe 406 and probe biasing member 408. Sensor 402 in one form is an optical interrupter type sensor having two opposed spaced arms 410, 412 mounted on a base 413. One of arms 410, 412 contains a light source 414, such as an LED, and the other arm contains a photoreceptor 416. A light beam from light source 414 activates photoreceptor 416 to actuate sensor 402. A flag or other blocking element interrupts the light beam causing sensor 402 output signal 403 to change state from a one state to another second state. Sensor 402 and light source 414 and photoreceptor 416 are connected via connector 417 to communication link 45 and are in operative communication with controller 3. Sensor 402, in another form, may be a limit switch 402-1 or a hall effect device 402-2 that is actuated by a member moving past sensor 402 (see inset in FIG. 6). The form of sensor 402 should not be considered to be a limitation of the present design but should have the characteristic that it produces an output signal that changes from one state to another when actuated or deactuated (going from a one state to another state, ON to OFF or OFF to ON).

Referring to FIGS. 3-6, plunger 404 is generally planar and rectangular and, in the orientation illustrated, has front and rear surfaces 420, 422, first and second vertical sides 424, 426 and a top and a bottom 428, 430, respectively. A planar arm 432 depends outwardly from front surface 420 at about a right angle and provides a mounting surface 434 for sensor 402 adjacent a top 436 of arm 432 that is also shown as being aligned with top 428 of plunger 404. Sensor 402 may be fastened to arm 432 using fasteners or, as illustrated, a pair of flexible latches 419 extend from base 413 and are received in corresponding openings 437 in arm 432 in a snap fit arrangement. A toothed rack 440 is positioned along first side 424 and may be formed into first side 424, as shown, or may be a separate member fastened to front surface 420, rear surface 422, or both front and rear surfaces 420, 422 wrapping around first side 424. Rack 440 extends vertically along first side 424 and engages with rack drive gear 314. Inboard of first side 424 is a slot 442 positioned parallel to rack 440. Slot 442 extends through plunger 404 and is sized to receive aligned posts 228, 230 on support 200 that extend through slot 442 so that posts 228, 230 allow plunger 404 to translate vertically for the illustrated orientation. A spring clip 444 attaches to each the distal end of aligned posts 228, 230 to slidably fasten plunger 404 to support 200. While aligned posts 228, 230 and spring clips 444 are shown, a single planar guide post, as indicated by the dashed lines in FIG. 3, may be used in place of posts 228, 230 and other fasteners such as a screw or snap fit latches be molded into the planar guide post to slidably retain plunger 404 to support 200. The number of posts and the manner in which plunger 404 is translatably retained to support 200 should not be considered as a limitation of the present sensor assembly 100.

Figure 7A:
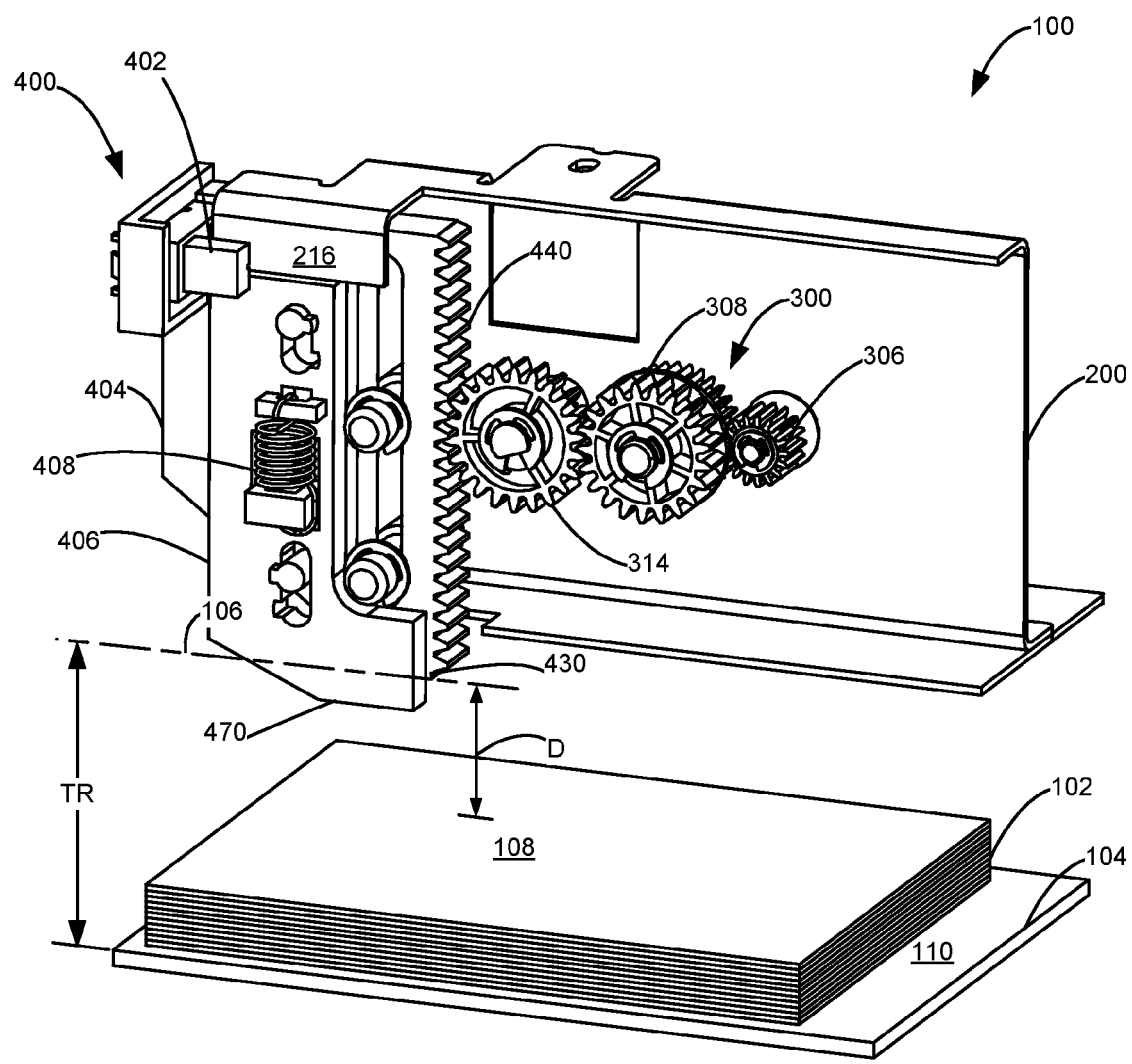
FIGS. 7A-7C are perspective views of the operation of the stack height sensor assembly during a portion of a measurement cycle where

The length of rack 440 and slot 442 is sufficient to allow plunger 404 to translate over a predetermined travel range TR (see FIG. 3 or 7A). The travel range TR is a predetermined distance between the bottom 430 of plunger 404 when stack height sensor assembly 100 is in its home position 106 and surface 110 of media staging area 104 and is dependent on the stapling capacity of stapler 11. Stack height measurements may be made by measuring the distance D down from the home position 106 to the top 108 of media stack 102 and then subtracting that distance D from the travel range TR. For example, for a stapler having the capacity to staple fifty sheets of twenty pound media, the travel range TR may be 8 mm or more, such as 19 mm. For a travel range TR of about 19 mm, rack drive gear 314 rotates thorough an arc of about 124 degrees. The amount of rotation of rack drive gear 314 is dependent on the number of teeth and module for rack 440 on plunger 404. The length of travel range TR is chosen so that when plunger 404 is at the home position 106 there will be no interference with the movement of media sheets into and out of media staging area 104 by either plunger 404 or probe 406 of insertion assembly 400.

For the orientation shown, plunger 404, probe 406 and sensor 402 are vertically translatable with respect to flag 216 of support 200 and aligned posts 228, 230 and will translate when rack drive gear 314 drives rack 440. Inboard of slot 442, are a pair of vertically aligned posts 446, 448, that are aligned with slot 442 and depend outwardly from front surface 420. The upper and lower posts, post 446, 448 may be provided at their respective distal ends with a locking feature, such as tabs 450, 452, extending radially outward. As shown tabs 450, 452 extend in opposite directions toward respective first and second sides 424, 426, of plunger 404. An additional post 454 may be provided intermediate posts 446, 448 and depend outwardly from front surface 420. Post 454 may serve as an attachment point from one end of probe biasing member 408.

Figure 6:
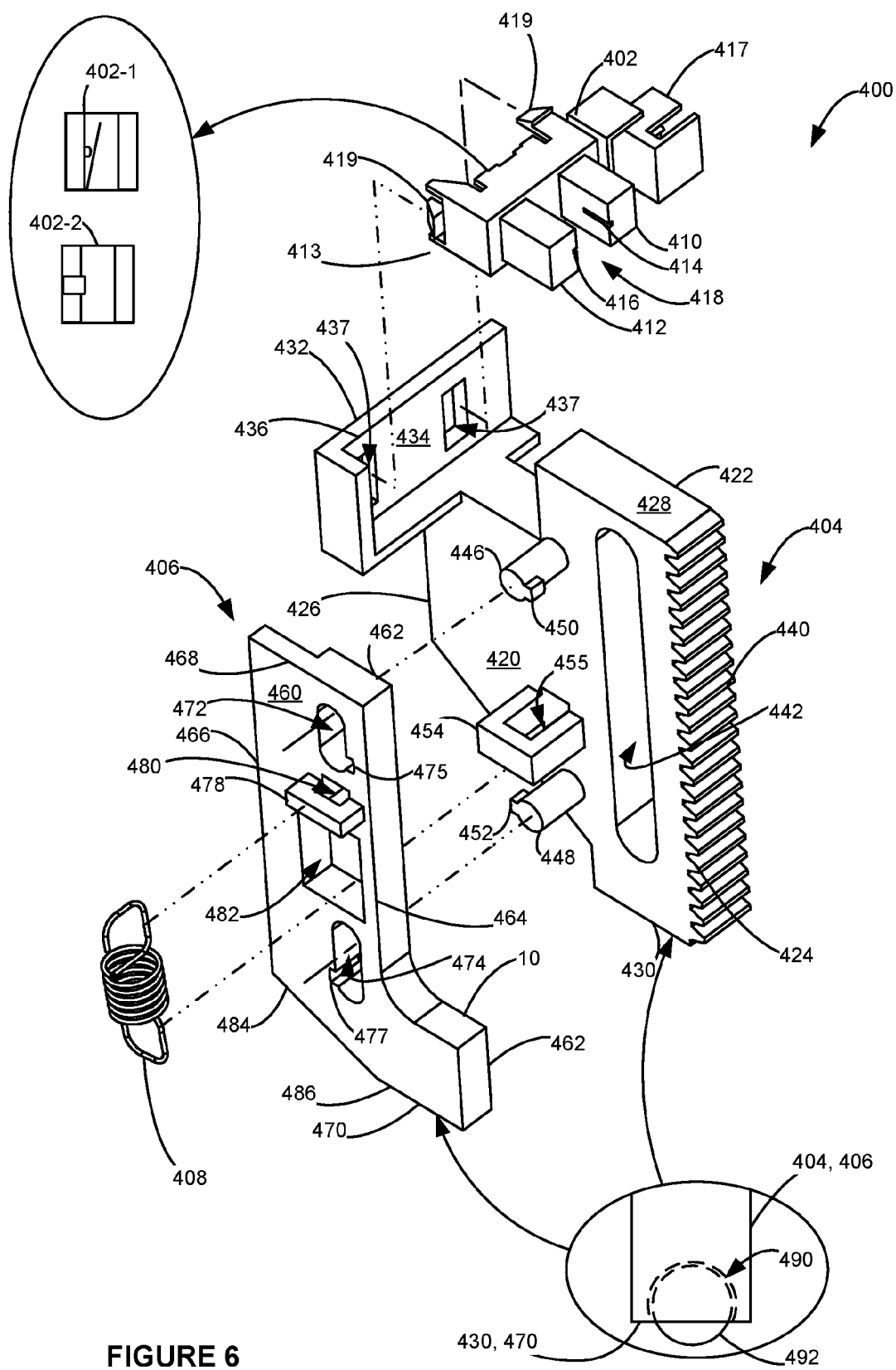
FIG. 6 is an exploded perspective view of an insertion assembly portion of the present stack height sensor assembly.

Probe 406 is generally planar and rectangular and, in the orientation illustrated in FIG. 3 or 6, has front and rear surfaces 460, 462, first and second vertical sides 464, 466 and a top end and a bottom end 468, 470, respectively. Upper and lower slots 472, 474 are aligned and sized to receive posts 446, 448, respectively. Both upper and lower slots, slot 472, 474, may each be provided with cutout 475, 477 adjacent to the bottom end of slots 472, 474 to accommodate the passage therethrough of tabs 450, 452, respectively, during assembly of probe 406 to plunger 404. Below upper slot 472, a member 478 depends outwardly from front surface 460 of probe 406 and is used to attach one end of biasing member 408 to probe 406. Member 478 may have an opening 480 therein for hooking one end of biasing member 408. Member 478 may also be a post having a channel that engages one end of biasing member 408. The manner of attachment of biasing member 408 to either plunger 404 or probe 406 should not be considered as a limitation of the design.

Slot 482 is provided through probe 406 intermediate slots 472, 474 and sized to accommodate post 454. The other end of biasing member 408 attaches to plunger 404 at post 454 via an opening 455 therein. The bottom 470 of probe 406 may be provided with an upwardly angled portion 484 as viewed and a flat or horizontal portion 486 or the bottom 470 may be flat or rounded. Flat portion 486 will contact the top 108 of media stack 102 during a measurement cycle. Probe 406 is slidably engaged with plunger 404 when mounted onto posts 446, 448 via respective slots 472, 474 so that probe 406 is able to translate opposite to the extension direction of plunger 404 or to allow plunger 404 to translate relative to probe 406 such as when probe 406 is on top 108 of media stack 102 and plunger 404 has not yet reached top 108 during a portion of a stack height measurement cycle. Tabs 450, 452, ride against the front surface 460 of probe 406 keeping probe 406 slidably and translatably attached to plunger 404. Biasing member 408 pulls probe 406 so that its initial position is such that its bottom 470 extends a predetermined extension distance 488 below the bottom 430 of plunger 404 (see insert in FIG. 7B). At this point, upper post 446 abuts the top end of upper slot 472 (see FIG. 3). This extension distance 488 may be in the range of about 5 mm to about 10 mm. When in this initial position, the upper end 468 of probe 406 will not actuate sensor 402. However, during a portion of a stack height measurement cycle when the respective bottoms of probe 406 and plunger 404 are aligned such as on the top 108 of the media stack 102 or at the surface 110 of the media staging area 104, the top end 468 of probe 406 extends into gap 418 to actuate sensor 402 causing its output signal 403 to change state. Slots 472, 474, 482 each have a length sufficient to allow this relative motion between probe 406 and plunger 404.

Also shown in the inset of FIG. 6 is an alternate bottom for plunger 404 and probe 406. A roller or ball 492 may be rotatably mounted in a recess 490 provided in respective bottoms 430, 470 of plunger 404 and probe 406. Roller or ball 492 extends below the bottoms 430, 470 and contacts one of the surface 110 of media staging area 104 or the top 108 of media stack 102. With this arrangement a measurement cycle may be performed while a topmost media sheet is still moving into media staging area 104.

Figure 7B:
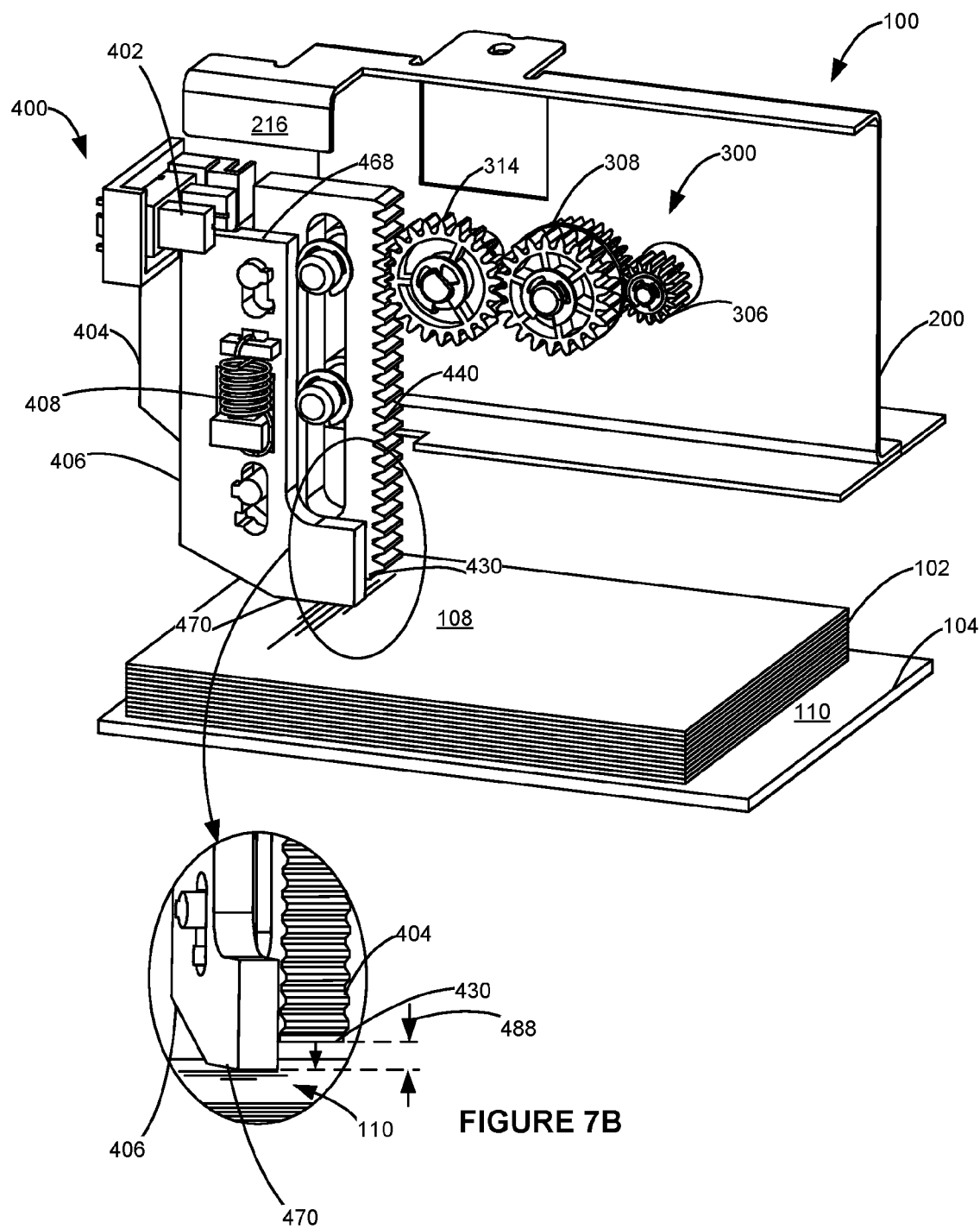
Figure 7C:
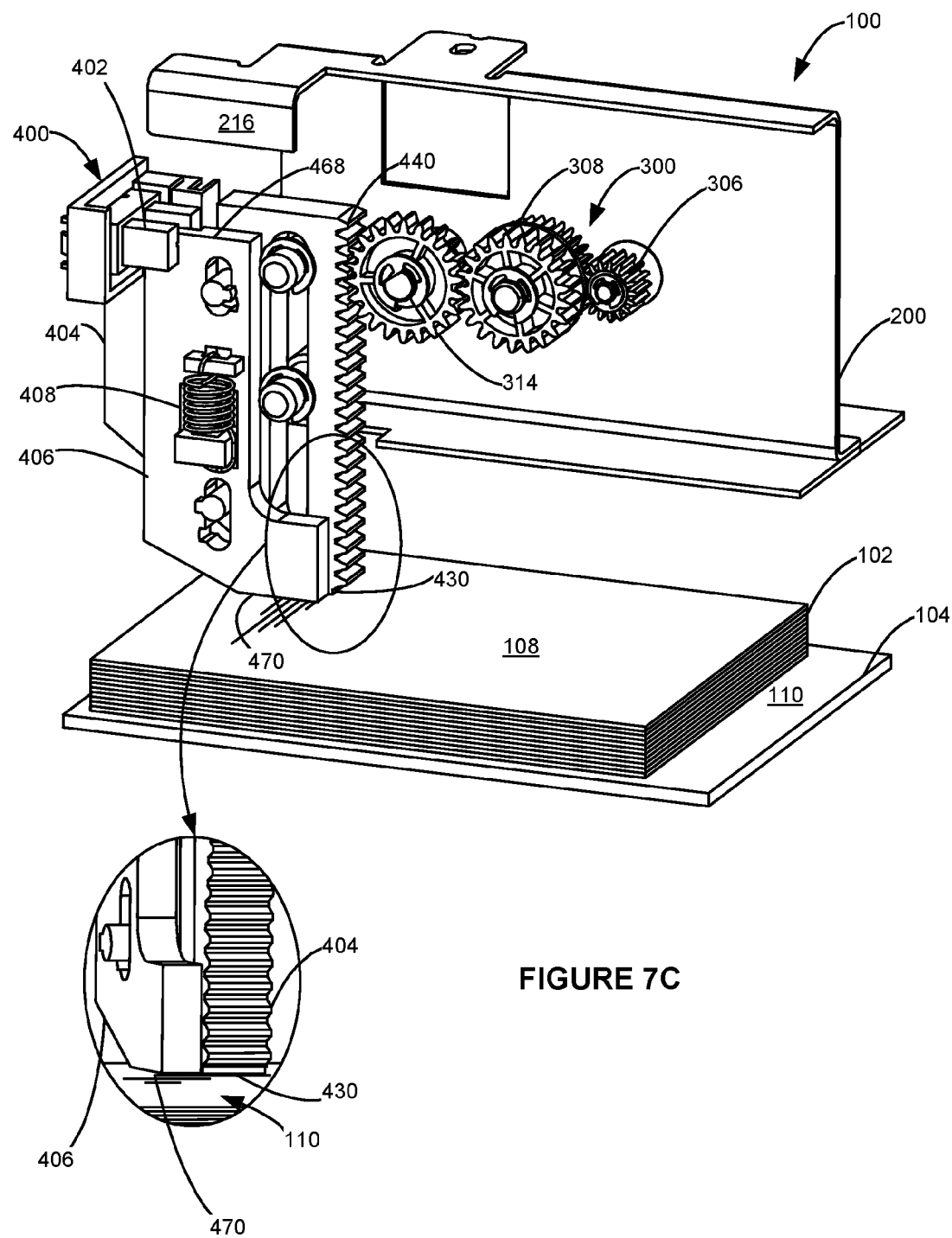

FIGS. 7A-7C illustrate operation of sensor 402 in sensor assembly 100. In FIG. 7A insertion assembly 400 is in its home position 106, biasing member 408 biases probe 406 such that at least one of posts 446, 448 abuts the top of its respective slot 472, 474 causing the bottom 470 of probe 406 to extend beyond bottom of plunger 404. As illustrated, post 446 abuts the top of slot 472. Flag 216 on first arm 214 is positioned in the gap 418 between arms 410, 412, actuating sensor 402 and placing sensor output signal 403 is a first state. In FIG. 7B as insertion assembly 400 extends due to rotation of rack drive gear 314 of drive assembly 300 against rack 440 of plunger 404, sensor 402 translates away from flag 216 allowing the output signal 403 of sensor 402 to change to a second state before probe 406 can contact the top 108 of media stack 102. As plunger 404 continues to extend, probe 406 is first to contact the top 108 of media stack 102 and stops while plunger 404 and sensor 402 continue downward as indicted by the arrow (see inset portion of FIG. 7B). In FIG. 7C, both probe 408 and plunger 404 are in contact with the top 108 of media stack 102 and sensor 402 has been actuated by the top 468 of probe 406 (see inset portion of FIG. 7C) and the output signal 403 changes back to a first state. Biasing member 408 has been extended due to the translation of probe 406 toward sensor 402 and is applying a translating force to probe 406 in the direction of the top 108 of media stack 102. During retraction, biasing member 408 initially holds probe 406 in contact with the top 108 of media stack 102 or surface 110 until the distance between the bottom end 430 of plunger 404 and one of the top of the stack of media and the surface of the media staging equals the predefined extension distance 488. At this point the top end 468 of probe 406 has moved so as to deactuate the sensor 402 causing the output signal 403 to change to the second state and probe 406 it returned to its initial position with respect to plunger 404 when plunger 404 as shown in either FIG. 7A or 7B. Slots 472, 474 are of a length to accommodate the movement of plunger 404 through the extension distance 488. As insertion assembly continues to retract toward home position 106, flag 216 reenters gap 418 and actuates sensor 402. This again causes the output signal of sensor 402 to again change from the second state back to the first state signaling that insertion assembly 400 has returned to its home position 106.

When no media is present in media staging area 104, controller 3 may exercise stack height sensor assembly 100 to determine or re-determine the travel range TR. Stack height sensor assembly would perform as described with respects to FIGS. 7A-7C, except that probe 406 would contact surface 110 of media staging area 104 and reverse direction and actuate sensor 402 as plunger 404 continues toward surface 110 of media staging area 104. The travel range TR as well as stack height H may be determined by using a timer within controller 3 to determine the time between when sensor 402 leaves the home position 106 and when it is again actuated by probe 406; or where motor 302 is a stepper motor using a counter to count the number of steps or fractional steps between when sensor 402 leaves the home position 106 and when it is again actuated by probe 406.

Figure 8:
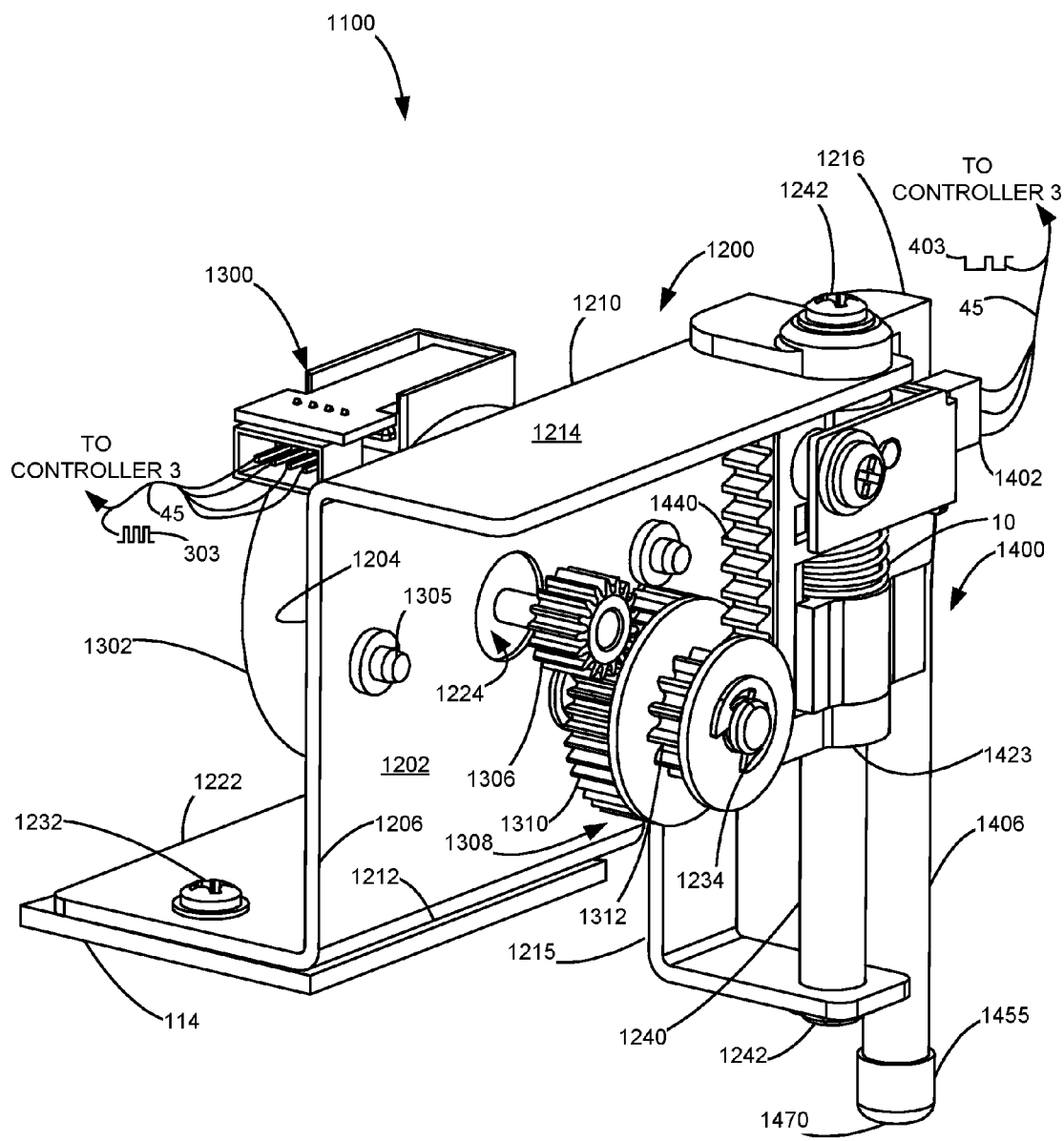
FIG. 8 is a front perspective view of a further embodiment of a stack height sensor assembly of the present disclosure.
Figure 9:
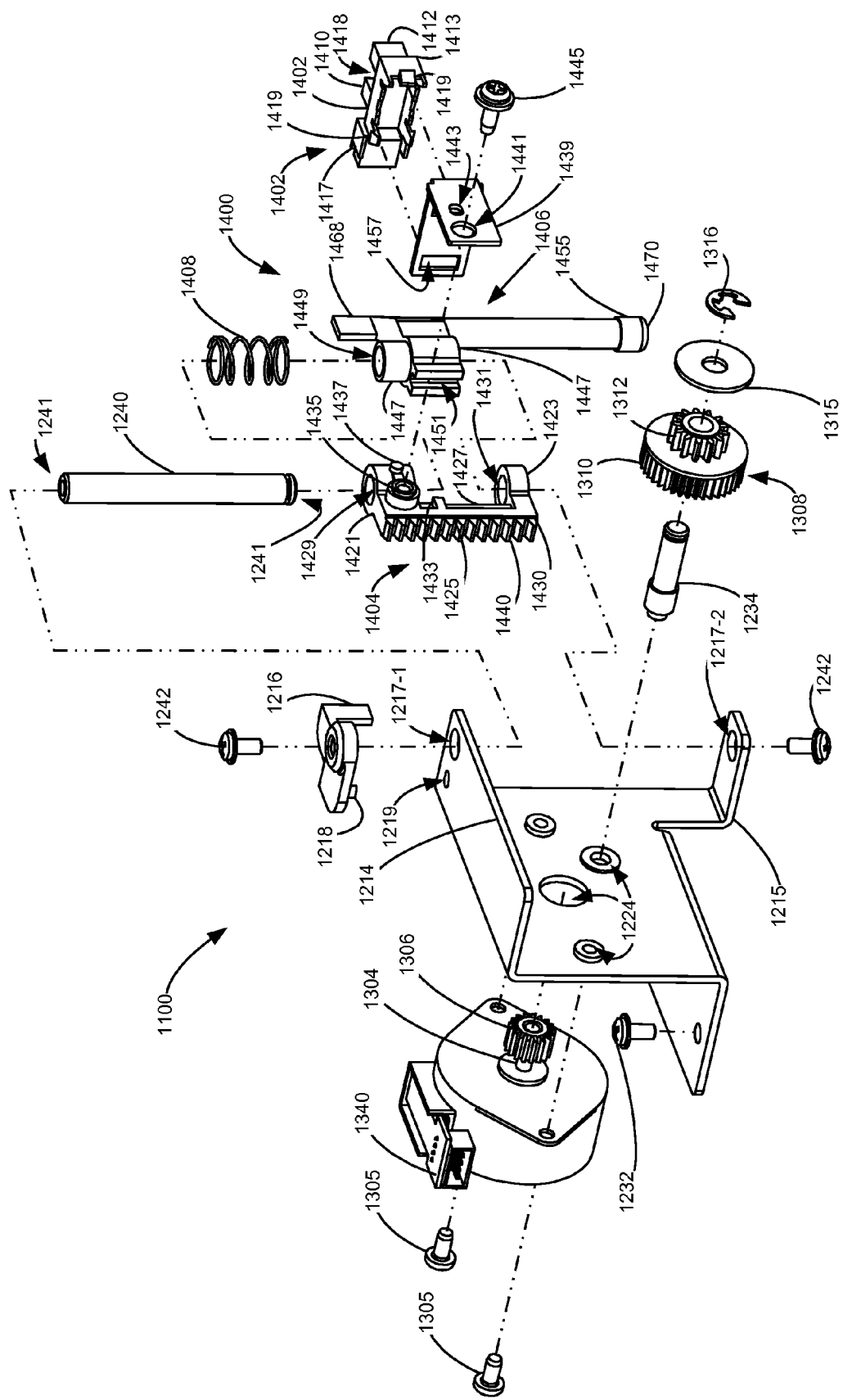
FIG. 9 is an exploded perspective view of the stack height sensor assembly of FIG. 8.

In FIGS. 8-9, another embodiment of a media stack height sensor assembly is illustrated. Stack height sensor assembly 100 provides a signal to controller 3 that may be correlated to the height and/or sheet count of the media stack 102 awaiting stapling and operates in a similar fashion to stack height sensor assembly 100. Similar components will have the same or similar reference numerals. Again in finisher 8, media stack 102 is positioned within a media staging area 104 on its surface 110. Stack height sensor assembly 1100 is positioned on support 114 adjacent one of the edges of media stack 102 and, as illustrated, is also positioned above media stack 102.

Stack height sensor assembly 1100 includes a support 1200 on which is mounted a drive assembly 1300 and an insertion assembly 1400 operably connected to the drive assembly 1300 with each assembly being in communication with controller 3 via communication link 45 as previously described. Insertion assembly 1400 is retractably extendible by drive assembly 1300 into a media staging area 104 within finisher 8 where the media stack 102 is held and aligned prior to stapling. A sensor 1402, mounted on insertion assembly 1400 and in electrical communication with controller 3 via communication link 45, a provides a output signal 403 that changes state as previously described when insertion assembly 1400 is extended and retracted between a home position 106 to one the top 108 of media stack 102 or surface 110 of media staging area 104 as previously described. Again, the output signal 403 of a single sensor, sensor 1402, is used to determine a stack height of media stack 102 and a home position of insertion assembly 1400.

For the illustrated orientation, support 1200 has front and rear surfaces 1202, 1204, first and second sides 1206, 1208 and a top and a bottom 1210, 1212, respectively. Depending outwardly from bottom 1212 and or rear surface 1204 is flange 1222 used to mount support 1200 in finisher 8. As shown fasteners 1232 attach flange 1222 to plate 114. Depending outwardly from top 1210 and/or front surface 1202 is first arm 1214. Depending outwardly from bottom 1212 and/or front surface 1202 is a second arm 1215 opposed to a portion of first arm 1214. Provided in first and second arms 1214, 1215 are aligned holes 1217-1, 1217-2, respectively. One or more openings 1224 are also provided in support 1200 for mounting of components of drive assembly 1300. A post 1240 for translatably supporting insertion assembly 1400 is mounted between first and second arms 1214, 1215 and aligned with openings 1217-1, 1217-2. For example, threaded axial openings 1241 may be provided in the ends of post 1240 to receive fasteners 1242 to attach post 1240 between first and second arms 1214, 1215. When mounted on arms 1214, 1215, post 1240 is spaced apart from front surface 1202 and is adjacent to second side 1208 of support 1200. One or more mounting bosses 1234 are provided on front surface 1202 for supporting components of drive assembly 1300. Also mounted on first arm 1214, is flag 1216 that is shown as being detachably mounted on top 1210 using fastener 1242 at opening 1217-1. When mounted, flag 1216 will actuate a sensor on insertion assembly 1400 when the sensor is at or translated into the home position 106. An alignment tab 1218 may be provided on the bottom of flag 1216 and is received in opening 1219 in top 1210 to ensure that flag 1216 will remain in alignment with the sensor on insertion assembly 1300 when fastener 1242 is being tightened.

Drive assembly 1300 mounts to support 1200 and functions substantially in the same manner as drive assembly 300. Drive assembly 1300 includes motor 1302 having output shaft 1304 with motor gear 1306. Motor 1302 is in electrical communication with controller 3 via connector 1340 that attaches to communication link 45 and receives a motor drive signal 303, such as a pulse train 303, from controller 3. Motor 1302 is reversible and substantially the same as those described for motor 1302. Motor 1302 is illustrated as being mounted on the rear surface 1204 of support 1200 with fasteners 1305, such as screws 1305. Shaft 1304 extends through opening 1224 with motor gear 1306 mounted on the portion of shaft 304 extending outwardly from front surface 1202. One or more intermediate gears, such as gear 1308 may be rotatably mounted to support 1200 via a corresponding boss, such as boss 1234, mounted on front surface 1202. Gear 1308 is secured to boss 1234 by flat washer 1315 and C-clip 1316.

As shown, intermediate gear 1308 is a compound gear having a first gear portion 1310 engaging with motor gear 1306 and a second gear portion 1312 engaging rack 1440 on insertion assembly 1400. Intermediate gear 1308 is driven by motor 1302 via gear 1306 and second gear portion 1312 engages with rack 1440 causing insertion assembly 1400 to translate between the home position 106 and, at its farthest extent, surface 110 of media staging area 104, depending upon the rotation direction of motor 1302.

Unlike intermediate gear 308, first and second gear portions 1310, 1312 of intermediate gear 1308 have the different diameters and first gear portion 1310 has a higher number of teeth than second gear portion 1312 and acts as a speed reducer. Second gear portion 1312 and rack 1440 have about same number or teeth. With this arrangement, the amount of rotation of motor gear 1306 will be greater than the corresponding amount of rotation of second gear portion 1312 and rack 1440 allowing for better control of the insertion and retraction of insertion assembly 1400. In one form motor gear 1306 has 17 teeth at a module of 0.5 mm with a pitch circle diameter of 8.5 mm; and, for intermediate gear 1308 first gear portion 1310 has 40 teeth and a module of 0.5 mm with a pitch circle diameter of 20 mm and second gear portion 1312 has 13 teeth and a module of 0.8 mm with a pitch circle diameter of 10.4 mm. The gear ratio from motor gear 1306 to first gear portion 1310 is 17/40 or approximately 0.425 while the linear speed ratio from motor gear 1306 to second gear portion 1312 is 0.52. It should be recognized that other gear and linear speed ratio may be used.

The gear ratios are chosen so that translation of insertion assemblies 400, 1400 may be used to determine the thickness of a single sheet of media. For example, a translation of about 0.0723 mm per quarter step of motor 1302 may be used to measure the thickness of a single sheet of 60 gsm (16 lb) paper of 0.081+/−0.006 mm. Further the gear ratio may also be used to hold the insertion assembly 1400 at its home position and at its measurement positions when motor 1302 is deenergized.

Insertion assembly 1400 includes sensor 1402, plunger 1404, probe 1406 and probe biasing member 1408. Sensor 1402 is substantially the same as sensor 402 previously described and operates in a similar manner. In one form is an optical interrupter type sensor having two opposed spaced arms 1410, 1412 mounted on a base 1413. One of arms 1410, 1412 contains a light source and the other arm contains a photoreceptor as previously described. A gap 1418 between arms 1410, 1412 is sized to receive flag 1216 when insertion assembly 1100 is in the home position 106. Sensor 1402 is connected via connector 1417 to communication link 45 and is in operative communication with controller 3. The form of sensor 1402 should not be considered to be a limitation of the present design but should have the characteristic that it produces an output signal that changes from one state to another when actuated or deactuated (going from a one state to another state, ON to OFF or OFF to ON).

Plunger 1404 is generally C-shaped having an upper arm 1421 and lower arm 1423 connected by a spine 1425. The outer surface of spine has a rack 1440 while the inner surface of spine has a longitudinal rib 1427. Toothed rack 1440 may be formed into spine 1425, as shown, or may be a separate member fastened to plunger 1404. The length of rack 1440 is sufficient to allow plunger 1404 to translate over the predetermined travel range TR as previously described.

Upper and lower arms 1421, 1423, respectively have aligned openings 1429, 1431 sized to be slidably received on post 1240 when plunger 1404 is mounted thereon. The gap between upper arm 1421 and lower arm 1423 is sized to allow probe 1406 to translate relative to plunger 1404 in order to actuate and deactuate sensor 1402 during a measurement cycle. A stop 1433 may be provided on spine 1425 to limit upward translation of plunger 1406 and in turn preventing the top 1468 of probe 1406 from colliding with flag 1216 when insertion assembly 1400 is in the home position 106. Provided on aside surface of upper arm 1421, are mounting boss 1435 and alignment tab 1437.

An L-shaped mounting bracket 1439 is used to attach sensor 1402 to plunger 1404. Openings 1441, 1443 are provide in one leg of bracket 1439 receive fastener 1445 and alignment tab 1443, respectively when bracket 1439 is mounted to the upper arm 1421 using fastener 1445 received in mounting boss 1435. Attached to the other leg of bracket 1439 is sensor 1402. Sensor 1402 may be fastened to bracket 1439 using fasteners or, as illustrated, a one of more flexible latches 1419 extending from base 1413 and are received in corresponding openings 1457 in bracket 1439 in a snap fit arrangement.

For the orientation shown, plunger 1404, probe 1406 and sensor 1402 are vertically translatable with respect to flag 1216 of support 1200 and post 1240 and will translate when intermediate gear 1308 drives rack 1440.

Probe 1406, as illustrated, is generally cylindrical and has a planar top end 1468 that is sized to be received into gap 1418 of sensor 1402 to actuate sensor 1402 when the probe 1406 reaches a measurement surface as previously described. Probe 1406 translatably mounts to post 1240 via an arm 1447 that is mounted on probe 1406 below planar top end 1468. Opening 1449 in arm 1447 receives post 1240 therethrough. A longitudinal channel 1451 may be provided on arm 1447. Channel 1451 is sized to slidably receive rib 1427 on spine 1425 of plunger 1404 and provides alignment between probe 1406 and plunger 1404 during translation and alignment between the top 1468 of probe 1406 and slot 1418 in sensor 1402. Arm 1447 is sized to be received between arms 1421, 1423 of plunger 1404 and, when the bottom of arm 1447 abuts the top of arm 1423, a gap 1453 (see FIG. 10A) will exist between the top of arm 1447 and the bottom of arm 1421. Biasing member 1408, as illustrated coil spring 1408, is also mounted on post 1240 in the gap 1453 between the bottom of arm 1421 and the top of arm 1447 and biases arm 1147 into an abutting position with bottom arm 1423 of plunger 1404. When in this position, top 1468 of probe 1406 does not actuate sensor 1402. Biasing member 1408 and arm 1447 mount on post 1240 between top and bottom arms 1421, 1423, of plunger 1404. The manner of attachment of biasing member 1408 should not be considered as a limitation of the design. Attached to bottom end 1470 of probe 1406 is a cap 1455 which is made from a resilient material, such as, for example, isoprene rubber. Cap 1455 provides sound damping when probe 1406 strikes the top 108 of media stack 102 or surface 110 during a measurement cycle. Also the alternate roller bottom for probe 406 shown in the inset of FIG. 6 may also be used with probe 1406 in place of cap 1455.

Probe 1406 is slidably engaged with plunger 1404 when mounted onto post 1240 so that probe 1406 is able to translate opposite to the extension direction of plunger 1404 or to allow plunger 404 to translate relative to probe 1406 such as when probe 1406 is on top 108 of media stack 102 and plunger 1404 has not yet reached top 108 during a portion of a stack height measurement cycle.

As previously described with respect to insertion assembly 400, biasing member 1408 moves probe 1406 so that its initial position is such that its bottom 1470 extends a predetermined extension distance 1488 below the bottom 1430 of plunger 1404 (see insert in FIG. 10AB). This extension distance 1488 may be in the range of about 2 cm to about 4 cm. When in this initial position, the upper end 1468 of probe 1406 will not actuate sensor 1402. However, during a portion of a stack height measurement cycle after probe 1406 has reached the top 108 of the media stack 102 or at the surface 110 of the media staging area 104, plunger 1404 continues toward one of the top 108 and surface 110 and the top end 1468 of probe 1406 extends into gap 1418 to actuate sensor 1402 causing its output signal 403 to change state. The gap between top and bottom arms 1421, 1423 is of a length sufficient to allow this relative motion between probe 1406 and plunger 1404.

Figure 10B:
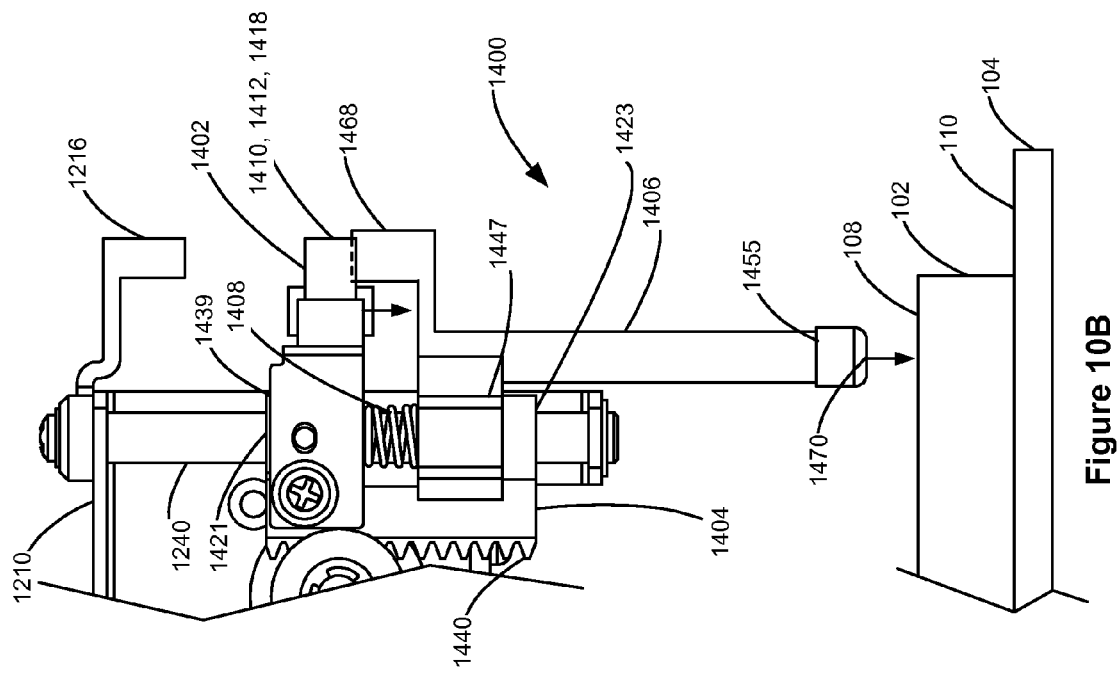
FIG. 10A-10D are perspective views of the operation of the stack height sensor assembly of FIG. 8 during a portion of a measurement cycle where
Figure 10A:
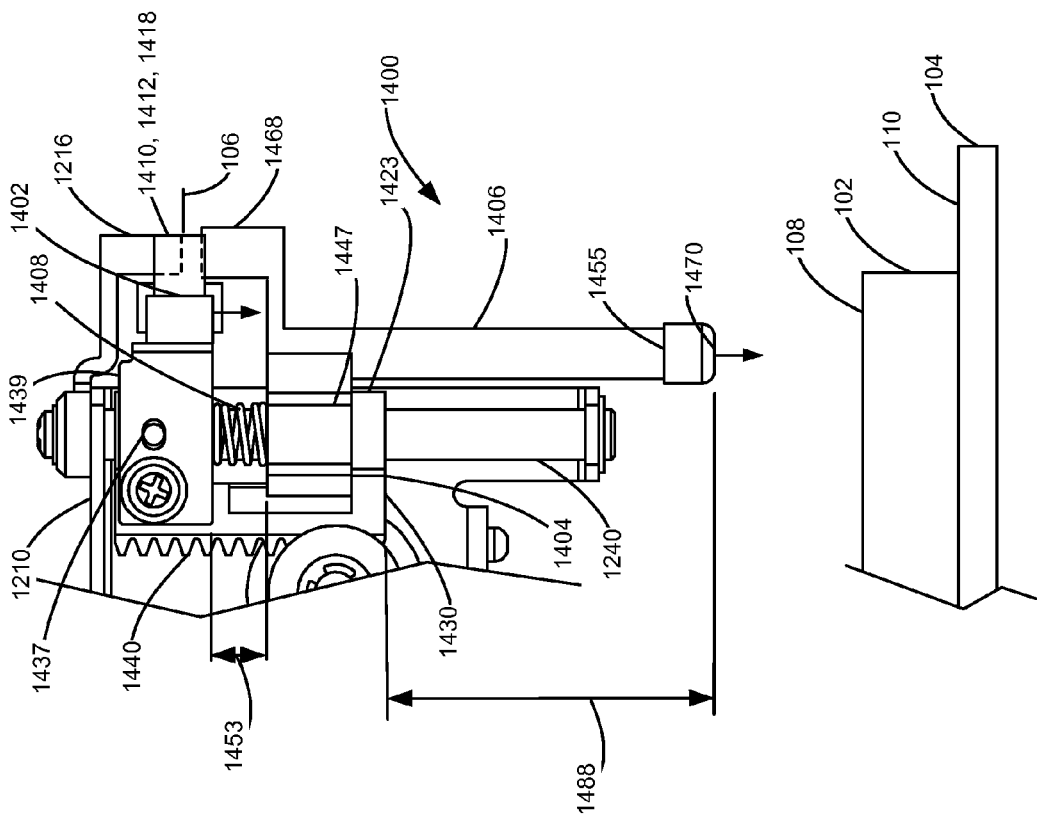
Figure 10D:
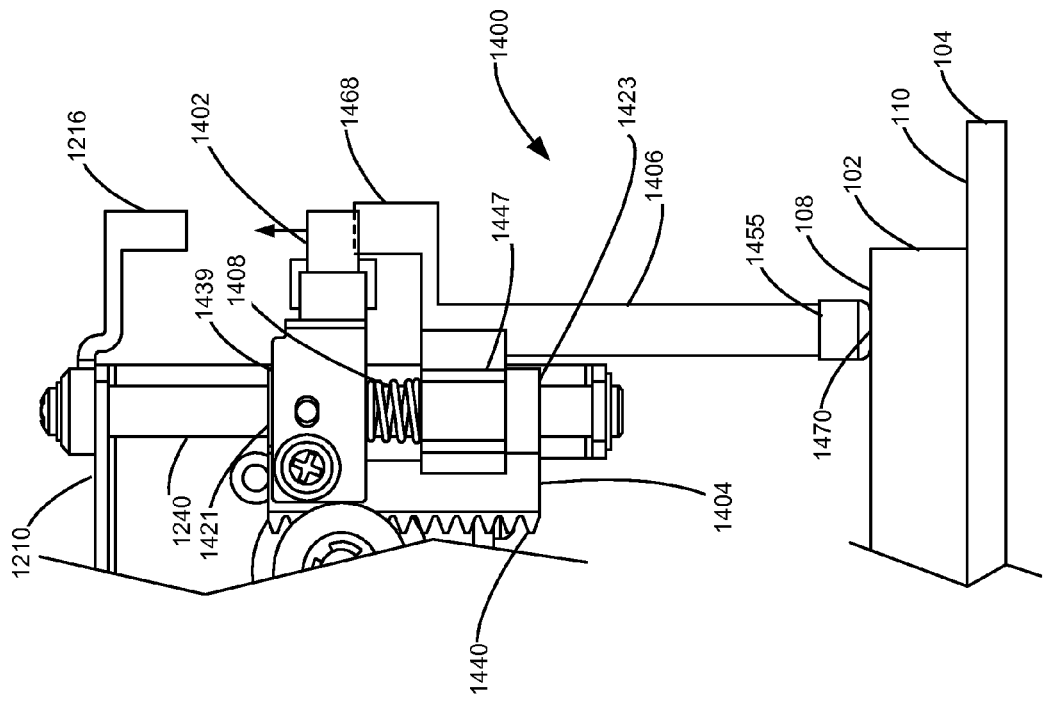
Figure 10C:
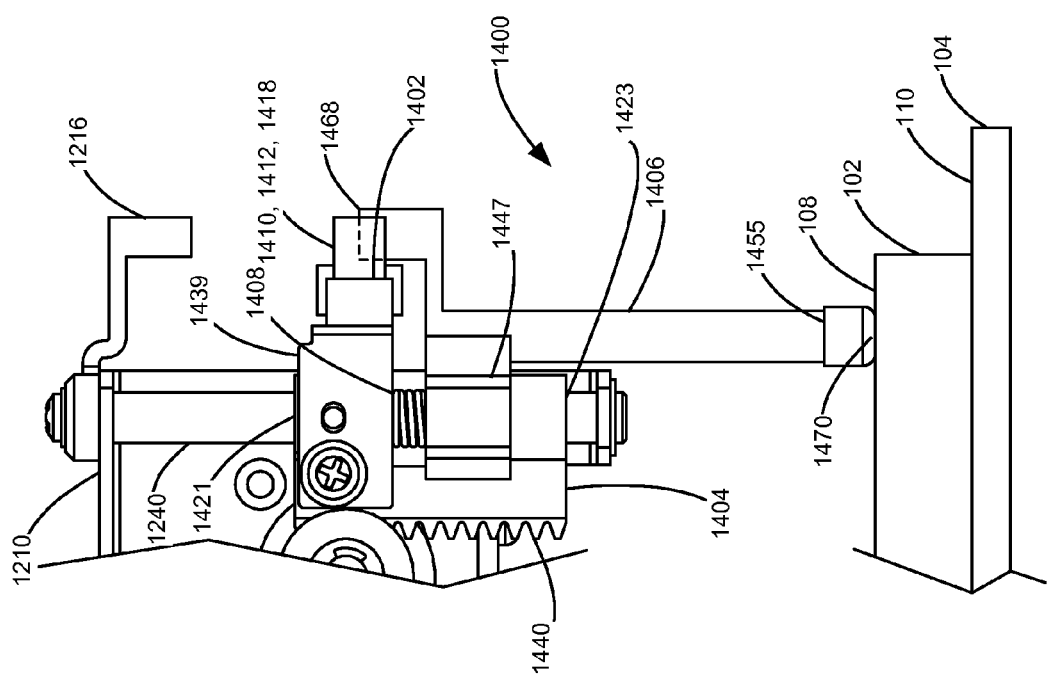

FIGS. 10A-10D illustrate operation of sensor 1402 in sensor assembly 1100. In FIG. 10A, insertion assembly 1400 is in its home position 106, biasing member 1408 biases probe 1406 such that arm 1447 of probe 1406 abuts lower arm 1423 of plunger 1404. Flag 1216 is positioned between in the gap 1418 between arms 1410, 1412 actuating sensor 1402 and placing sensor output signal 403 is a first state. In FIG. 10B as insertion assembly 1400 extends, translating both plunger 1404 and probe 1406 as indicated by the arrows, due to the action of drive assembly 1300 against rack 1440 of plunger 1404, sensor 1402 translates away from flag 1216 allowing the output signal 403 of sensor 1402 to change to a second state before probe 1406 contacts the top 108 of media stack 102. In FIG. 10C, as plunger 1404 continues to extend, probe 1406 contacts the top 108 of media stack 102 and stops while plunger 1404 and sensor 1402 continue downward compressing biasing member 1408 and the top 1468 of probe 1406 has entered into gap 1418 a sufficient distance to actuate sensor 1402 which changes the state of the output signal 403 of sensor 1402. Unlike stack height measurement sensor assembly 100, only probe 1406 contacts the media stack 102 or surface 110 of media staging area 104. In FIG. 10D, drive assembly has reversed direction and has begun to retract plunger 1104 while biasing member 1408 is holding probe 1406 in contact with the top 108 of media stack 102. Sensor 1402 has moved away from the top 1468 of probe 1406 as indicated by the directional arrow and as a result the output signal 403 of sensor 1402 has again changed state. As drive mechanism 1300 continues to retract insertion assembly 1400, insertion assembly 1400 will return to its home position shown in FIG. 10A where flag 1216 once again actuates sensor 1402.

While stack height sensor assemblies 100, 1100 have been described with respect to its use within finisher 8, such assemblies may be provided elsewhere within image forming device 2, such as in one or more of removable input trays 17 within either housing 20 or option assembly 9, within media input tray 61 of ADF 60 of scanner system 6, or anywhere within image forming device 2 where media may be accumulated into a stack.

Figure 11:
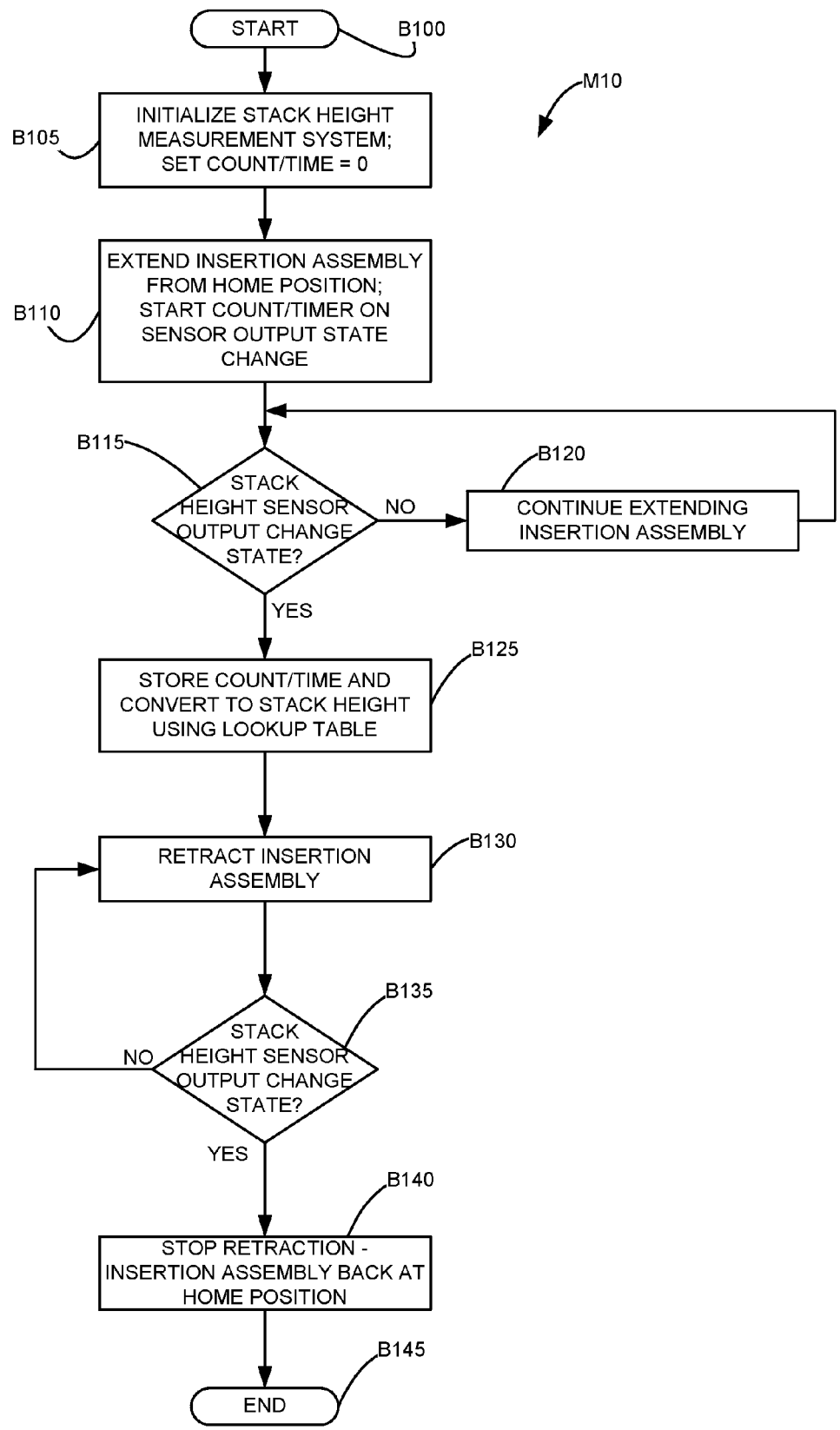
FIG. 11 is a flow diagram of one embodiment of the present method of making a measurement cycle.
Figure 12:
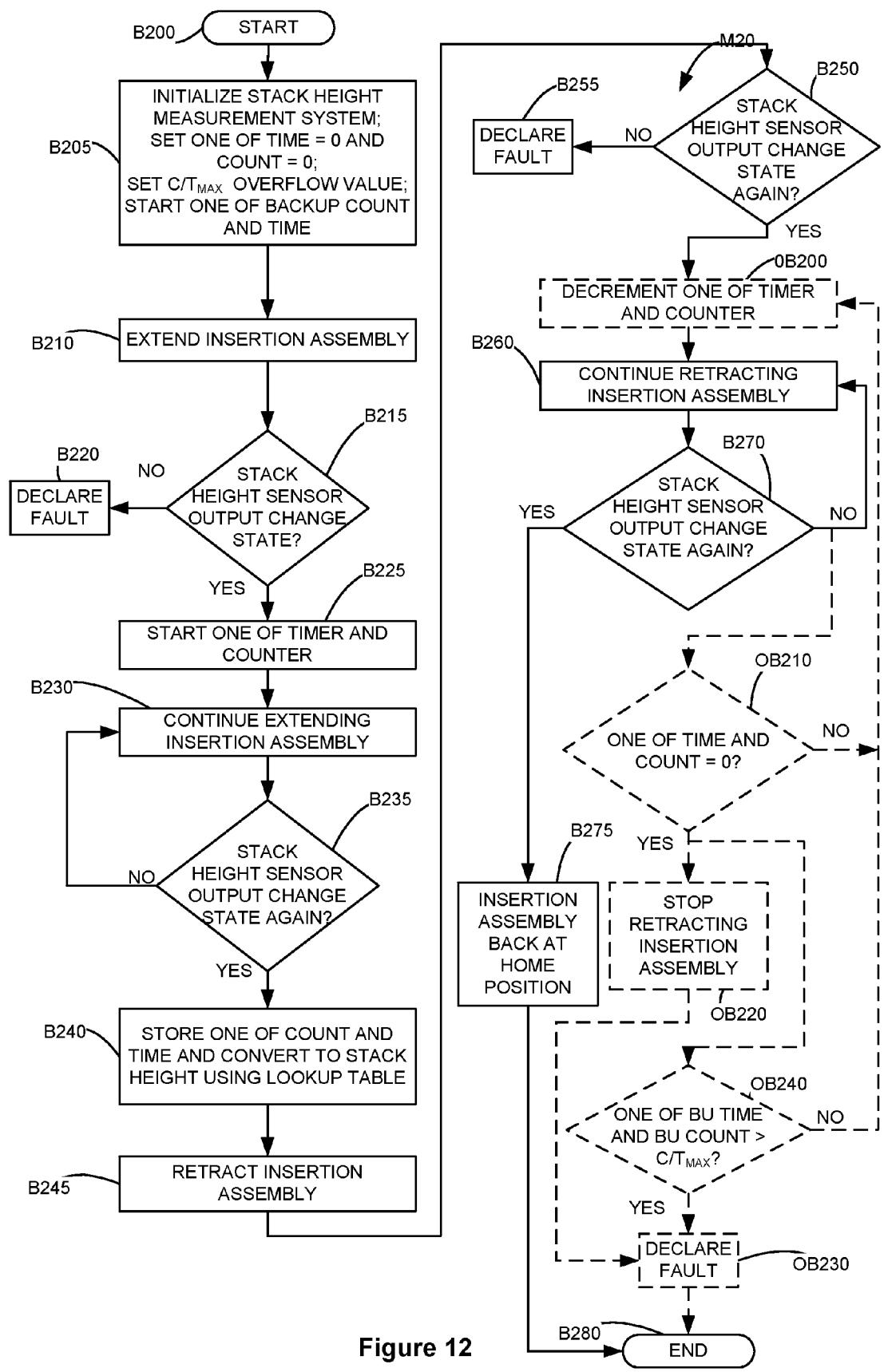
FIG. 12 is a flow diagram of a further embodiment of the present method of making a measurement cycle.

Referring now to FIGS. 11-12, methods for taking a measurement cycle using stack height sensor assemblies 100, 1100 are shown. In the following description reference will be made to stack height sensor assembly 100 as both assemblies operate in a substantially similar manner unless otherwise stated. In FIG. 11, method M10 is shown. Method M10 starts at block B100 and proceeds to block B105 where the stack height measurement system is initialized and one of a timer or counter is set to zero. Method M10 proceeds to block B110 where insertion assembly 100 moves from the home position 106 deactuating sensor 402 as it translates away and the state change in the output signal 403 is used to start one of a counter or timer, such as counter 116 or timer 118. At this point sensor 402 has translated away from flag 216. Controller 3 starts motor 302 of drive assembly 300 to extend insertion assembly 400 moving plunger 404 and probe 406 away from home position 106. Next at block B115, method M10 determines due to the interaction of sensor 402 with probe 406 whether or not the output signal 403 of sensor 402 changes state indicating that it has reached the top of the media stack of the job or, when a travel range TR is being determined, the surface of the media accumulation location, such as surface 110 of media staging area 104. When it is determined that no change of state has occurred at block B115 in the output signal of sensor 402, method M10 proceeds to bock B120 to continue to extend insertion assembly 400. When it is determined at block B115 that the output signal of sensor 402 has changed state, method M10 proceeds to block B125 where one of a count or a time is stored by controller 3 and is then converted to a stack height H or travel range TR using look up table 112. Next at block B130, controller 3 retracts insertion assembly 400 by reversing motor.

At block B135, method M10 makes a determination whether or not the output signal 403 of sensor 402 has changed state. When it is determined that the state of output signal 403 of sensor 402 has not changed state, indicating insertion assembly 400 has not returned to its home position 106, method M10 loops to block B130 and continues retracting insertion assembly 400. When it is determined that the state of output signal 403 of sensor 402 has changed state, indicating insertion assembly 400 has returned to its home position, such as home position 106, method M10 proceeds to block B140 where insertion assembly 400 has returned to its home position. Method M10 ends at block B145.

Referring now to FIG. 12 more detailed method of stack height measurements is presented. Method 20 starts at block B200 and proceeds to block B205 where the stack height measurement system is initialized and one of a timer or counter is set to zero. Method M20 proceeds to block B210 where insertion assembly 400 is extended from the home position. Next at block B215, a determination is made whether or not the output signal 403 of sensor 402 has changed state. When it has been determined that the output signal 403 of sensor 402 has not changed state, indicating that plunger 404, sensor 402 and probe 406 have not left home position 106 or a possible fault in sensor 402, method M20 proceeds to block B220 where a fault is declared and method M20 ends. When it has been determined at block B215 that the output signal 403 of sensor 402 has changed state, indicating that insertion assembly 400 including plunger 404, sensor 402 and probe 406 has left home position 106, method M20 proceeds to block B225 where one of a counter 116 and a timer 118 is started. Thereafter at block B230, extension of insertion assembly 400 continues.

Next at block B235, a determination is made whether or not the output signal 403 of sensor 402 has changed state again. When it has been determined that the output signal of sensor 402 has not changed state again, indicating that insertion assembly has not reached either the top 108 of media stack 102 or surface 110 of media staging area 104, method M20 loops back to block B230 to continue extension of insertion assembly 400. When it has been determined at block B235 that the output signal 403 of sensor 402 has changed state again, indicating that insertion assembly 400 has reached the top 108 of media stack 102 or surface 110 of media staging area 104, method M20 proceeds to block B240 where one of a count or a time is stored and converted to a stack height or a travel range TR using lookup table 112.

At block B245 method M20 retracts insertion assembly 400. To see if insertion probe is retracting, at block B250 a determination is made to see whether or not the output signal 403 of sensor 402 again changes state. When it is determined that the output signal 403 of sensor 402 has not changed state, method M20 proceeds to block B255 where a fault is declared and method M20 ends. When it is determined that the output signal of stack media height sensor 402 has again changed state at block B260 retraction of the insertion assembly continues.

Thereafter, as insertion assembly 400 nears its home position 106, at block B270 a determination is again made to see whether or not the output signal 403 of sensor 402 again changes state. When it is determined that the output signal 403 of sensor 402 has not changed state, method M20 proceeds to block B260 to continue retracting insertion assembly 400. When it is determined, at block B270, that the output signal 403 of sensor 402 has again changed state, then at block B275, method M20 recognizes that insertion assembly 400 has returned to its home position 106 and method M20 ends at block B280.

In addition, a further operational backup may be employed. After it is determined at block B250, that the output signal 403 of sensor 402 has again changed state, then at optional block OB200 one of the count or time is decremented and method M20 proceeds to block B260 to continue retraction of insertion assembly 400. When it is determined at block B270, that the output signal 403 of sensor 402 did not change state again, a further determination may be made at optional block OB210 to determine whether or not one of the count and time has decremented to zero. When it is determined that one of the count and time has decremented to zero, further retraction of the insertion assembly 400 is stopped, at optional block OB220, optionally, a fault may be declared at optional block OB230, and method M20 proceeds to block B280 and ends. At optional block OB 210, when it is determined that one of the count or time has not decremented to zero, method M20 may loop back to optional block OB200. This optional process may be used to prevent overdriving the insertion assembly 400 in the retraction direction in case of malfunction in sensor 402.

In addition, a further sensor check may be used. At block B205 during initialization of the system, a predetermined maximum one of a count and time overflow value $C/T_{MAX}$ is set and may be used as an additional backup in the event of a malfunction in sensor 402. The overflow value $C/T_{MAX}$ is one form is a count or a time that is greater than the count or the time needed for the insertion assembly 400 to complete a measurement cycle with no media present in the media staging area 104. Also at block B205 a backup counter is initialized. Thereafter at optional block 210 when it is determined that one of the count or time has reached zero, method M20 proceeds to optional block OB240 where a determination is made whether or not one of the backup count and backup time is greater than the overflow value overflow value $C/T_{MAX}$. At optional block OB240, when it is determined that one of backup (BU) count and BU time is greater than overflow value $C/T_{MAX}$, then method M20 proceeds to optional block OB230 where a fault is declared. At optional block OB240, when it is determined that one of backup (BU) count and BU time is not greater than overflow value $C/T_{MAX}$, then method M20 proceeds loops back to optional block OB200.

Figure 13:
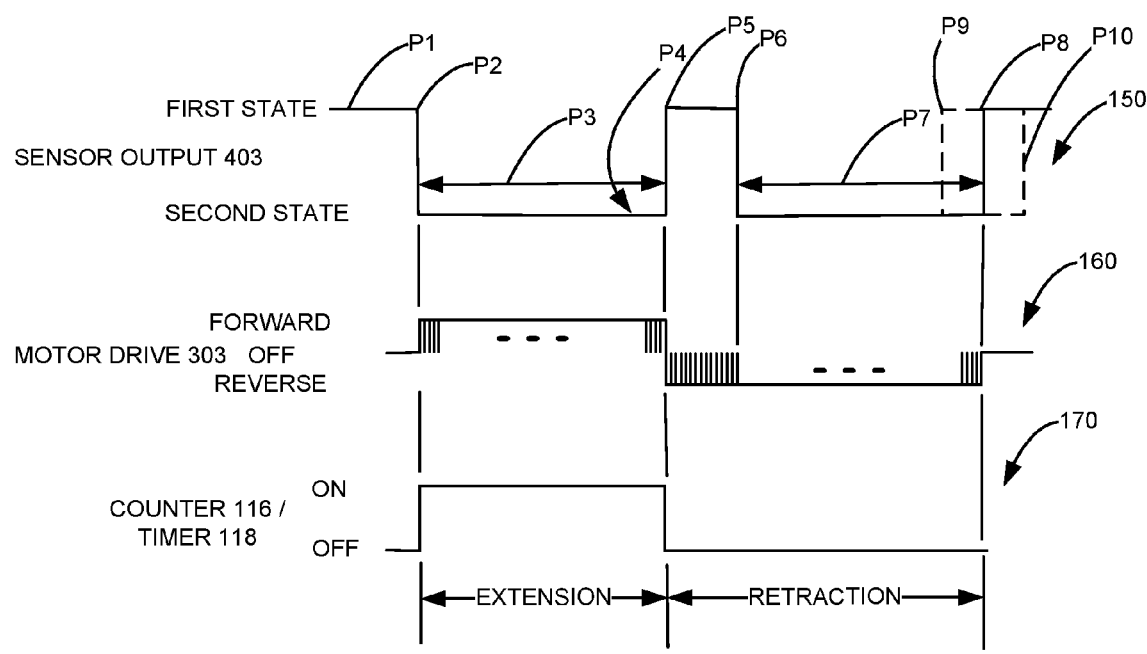
FIG. 13 is a timing diagram of the stack height sensor assembly during a measurement cycle.

FIG. 13 provides an example timing diagram of the operation of stack height sensor assembly 100 during one measurement cycles. Three timing lines are presented, line 150 represents the state of the output signal of sensor 402, line 160 represents the forward/reverse drive signal for motor 302 and line 170 represent the counter 116 count or timer 118 time period. At P1 sensor 402 is in the home position 106 and motor 302 and counter 116 and timer 118 are off.

At P2, extension of insertion assembly is started motor 302 and insertion assembly 400 are actuated and sensor 402, plunger 404, probe 406 have move away from home position 100 and the output of sensor 402 has changed from a first state to a second state. Also one of counter 116 or timer 118 is started.

During period P3 insertion assembly 400 is extending toward one of the top 108 of media stack 102 or surface 110 of media staging area 104 and if cam 322 is provided, cam 322 transitions to its second stability point. At P4, probe 406 contacts toward one of the top 108 of media stack 102 or surface 110 of media staging area 104. At this point probe extension stops while plunger 404 continues to translate toward one of the top 108 or surface 110 and sensor 402 approaches the top end 468 of probe 406. At P5 plunger 404 contacts one of the top 108 of media stack 102 or surface 110 of media staging area 104 and concurrently therewith, probe 406 actuates sensor 402 causing the output signal 403 of sensor 402 to change from second state to the first state. For stack height sensor assembly 1400, plunger 1404 does not contact either the top 108 of the media stack 102 or surface 110 but does continue to extend until the top 1468 of probe 1406 actuates sensor 1402. At this point, one of counter 116 and timer 118 is stopped. Motor 302 may be turned off and plunger 404 and cam 322 and biasing member 328, if provided, may be used to hold media stack 102 during stapling by stapler 11. As shown, motor 302 at P5 reverses direction to retract insertion assembly 400. As insertion assembly starts to retract, biasing member 408 continues to hold probe 406 against top 108 or surface 110. When, as at P6 plunger 404 has been retracted a distance from the top 108 of media stack 102 or surface 110 equal to the extension distance 488, the top end 468 of probe 406 has moved so that it no longer actuates sensor 402 returning the output signal 403 of sensor 402 to the second state.

During period P7, insertion assembly 400 is being further retracted by drive assembly 300 and sensor 402 is approaching stationary flag 216 on first arm 214 of support 200 and cam 322, if provided has transition back to its other stable position to help bias insertion assembly 400 in its home position. At P8 sensor 402 is actuated by flag 402 and the output signal 403 of sensor 402 again changes back to the first state. At this point the measurement cycle is complete and the stack height insertion assembly is back at home position 106 ready to repeat the cycle again. Motor 302 may be turned off. Periods P3 and P7 are illustrated as being approximately equal however, during retraction period P7 may be shorter or longer, as indicated at P9, P10. This may be accomplished by changing the speed of motor 302.

Where motor 302 is a stepper motor, the number of steps or fractional steps of the motor drive signal from controller 3 may be counted and converted to determine the distance D. FIG. 14 presents 4 tables, labeled Table 1-Table 4, providing empirically determined counts of stepping pulses used to drive motor 302. Each table has 5 columns, the first column header being the number of sheets in media stack 102, column 2-5 headers providing the media weight. The media weights from column 2 through column 5 are 110 pound, 90 pound, 32 pound and 20 pound media. Below the column header information are 6 data rows for sheet stacks of 0, 10, 20, 30, 40 and 50 sheets and the number of partial steps or pulses sent to drive motor 302. Zero sheets which represents the travel range TR or distance from the home position to the surface 110 of media staging area 104. Table 1 provides the number of half steps, Table 2 quarter steps, Table 3 eighth steps and Table 4 sixteenth steps. The step values provided in Tables 2-4 are derived from those presented in Table 1. The number of pulses used to reach each distance D (or the travel range TR) is a function of the type of stepper motor used. Where an encoder is provided on motor 302, the encoder pulses are counted and used to determine the distance D and travel range TR.

As can be seen in Table 1 for 110 pound media and stacks of 0, 10, 20, 30, 40, and 50 sheets, the number of half steps are 68, 59, 50, 48, 41, 36; for 90 pound media, 68, 61, 54, 50, 45, 37 steps; for 32 pound media, 68, 64, 58, 52, 50, 49 steps; and for 20 pound media, 68, 64, 62, 54, 52, 50 steps. Where the stack height is the controlling factor in determining the number of sheets that can be stapled, stack height may be equated to the number of steps. For example, if the capacity of the stapler is fifty sheets of twenty pound media as seen in the numbers in a bold and enlarged font this equates to 50 half steps. Accordingly for the other media weights 50 half steps occurs when there are 20 sheets of 110 pound media, 30 sheets of ninety pound and 40 sheets of 32 pound media.

In Table 2 for 110 pound media, the derived corresponding step quarter counts are 118, 110, 96, 82, 72 or twice the number of half steps. In Table 3 found 110 pound media, the corresponding derived eighth steps counts are 276, 236, 200, 192, 164, 144 or four times the number of half steps. In Table 4, for 110 pound media, the corresponding derived sixteenth steps counts are 552, 472, 400, 384, 328, 288 or eight times the number of half steps. The values of step counts for the other three media weights are calculated in a similar manner.

It will be appreciated that for a given number of media sheets and a given step size as the weight of the media decreases the number of steps increase and further that as the size of the partial step decreases the difference in the number of steps between correspond numbers of sheets of media of different weight increases, either of these allow the stack height sensor measurement to also provide an indication of the weight of the media which may be used by controller 3 to adjust in image forming device 2 operating parameters such as toner transfer voltages, fusing pressure and temperature, media feed roller nip height and media speed along media path P including media speed during toner transfer or during fusing.

Figure 15:
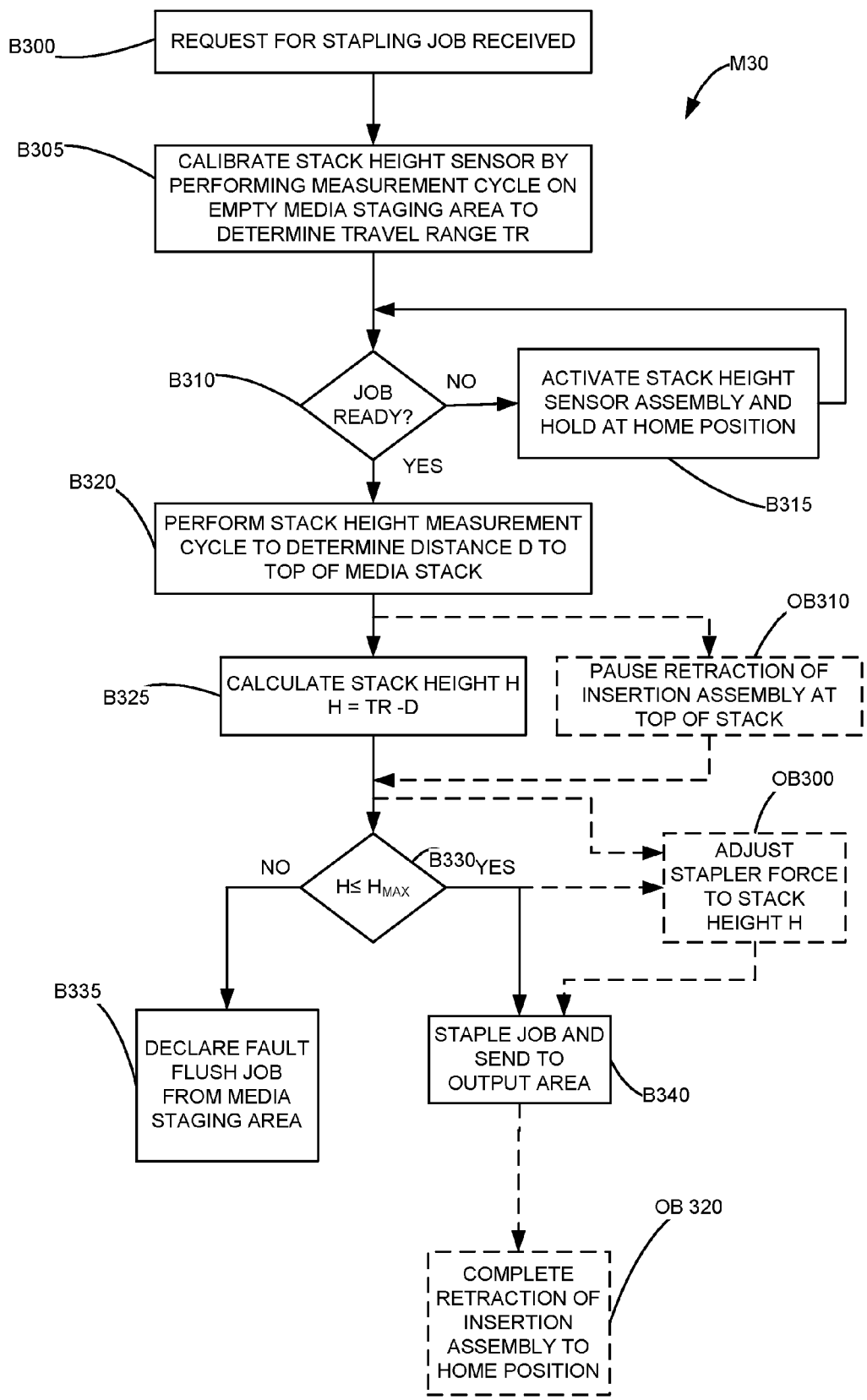
FIG. 15 is a flow diagram of a method of using the stack height sensor assembly for stapling of a job.

FIG. 15 illustrates a method of stapling using the stack height sensor assembly 100. In method M10, at block B 300 controller 3 receives a request for a stapling job. Next at block B305 a calibration of the stack height sensor assembly 100 is done by performing a measurement cycle on an empty media staging area 104 to determine the travel range TR. Next a block B310, a determination is made whether or not a job is ready. A job may be that media stack 102 is present in media staging area 104 of finisher 8. Controller 3 makes the determination when a job is ready. When it has been determined that the job is not yet ready, at block B115 media stack height assembly is activated but held in the home position and method M30 loops back to block B310. In one form, motor 302 is activated and insertion assembly 400 is held at its home position, such as home position 106.

When a determination is made that the job is ready, method M30 proceeds to block B320 to perform a stack height measurement cycle as described in FIG. 11 or 12 cycle to determine the distance D to the top 108 of media stack 102. Next at block B325, the stack height H is calculated by subtracting D from the travel range TR. Next at block B330 a determination is made whether or not the height H is less than or equal to a predetermined maximum height $H_{MAX}$. When it is determined that the height H is not less than or equal to a predetermined maximum height $H_{MAX}$, method M30 proceeds to block B335 where a fault is declared and the job is flushed to the output area 38. When a fault is declared, controller 3 may provide a message on display 36 or flash an error indicator light. When it is determined that the height H is less than or equal to a predetermined maximum height $H_{MAX}$, method M30 proceeds to block B340 where stapler 11 is activated and the job is stapled and then sent to output area 38 for pick up by the requesting party.

Where the force of stapler 11 can be adjusted by controller 3, then when it is determined at block B330 that the height H is less than or equal to a predetermined maximum height $H_{MAX}$, method, method M30 proceeds to optional block OB300 where the force used by stapler 11 is adjusted to the stack height H. Method M20 then proceeds to block B340. Lookup table 112 may be provided with the information that correlates stack height to stapling force. In addition, if media type is known such as from media sensor 27, the amount of stapling force provided in lookup table 112 needed may be further refined to provide stapling force dependent on both media type and media stack height.

Additionally, concurrently with determining stack height H at block B325, at optional block OB310, the retraction of insertion assembly 400 is paused at the top 108 of media stack 102 and used to hold media stack 102. Thereafter after completion of the act of stapling at block B340, at optional block 320, the retraction of insertion assembly 400 to home position 106 is completed. Optional blocks 310, 320 may be used when shaft 320, lever 324 and spring 332 are provided and optional blocks 310, 320 may be used when these elements are not provided in drive assembly 300. In a further form, the stapling method M30 has proceed from block B325 where the stack height H is determine to optional block OB300 where the stapler force is adjusted to the stack height H. This may be used where the stapler capacity is not limited by the stack height H.

The foregoing description of embodiments has been presented for purposes of illustration. It is not intended to be the bottom 430 of plunger exhaustive or to limit the present disclosure to the precise steps and/or forms disclosed, and obviously many modifications and variations are possible in light of the above teaching. It is intended that the scope of the invention be defined by the claims appended hereto.

What is claimed is:

1. A stack height sensor assembly for determining a media stack height in an image forming device, the stack height sensor assembly comprising:
    a support having a first arm depending therefrom forming a stationary actuating member, the support mountable adjacent to a media staging area in the image forming device;
    a drive assembly mounted on the support and consisting of
        a reversible motor operably connectable to a controller in the image forming device, the motor having a drive gear on an output shaft thereof; and
    an insertion assembly translatably mounted to the support, the insertion assembly having a home position adjacent the first arm, the insertion assembly consisting of:
        a plunger translatably mounted to the support having a top end adjacent the first arm and a bottom end, the plunger in operable engagement with the drive gear;
        a sensor mounted on the top end of the plunger having an output signal that changes to a first state and to a second state when the sensor is actuated and deactuated, respectively, the sensor and output signal operably connectable to the controller;
        a probe translatably mounted to the plunger, the probe having a top end and a bottom end; and
        a biasing member connected the probe and to the plunger wherein the probe is biased against the plunger such that a portion of the probe at the bottom end thereof extends a predefined extension distance below the bottom end of the plunger,
    wherein, with the support mounted adjacent to the media staging area, the sensor and motor being operably connected to the controller and the insertion assembly in the home position, the stationary member actuates the sensor causing the output signal to be in the first state, and, wherein energizing the motor by the controller for rotation in a first direction translates and extends the insertion assembly away from the home position and the stationary actuating member causing the output signal of the sensor to change to the second state and on continued extension the bottom of the probe initially contacts one of a top of a stack of media when present in the media staging area and a surface of the media staging area, thereafter, the plunger and sensor continue to extend until the bottom ends of both the plunger and probe contact one of the top of the stack of media and the surface of the media staging area and the top end of the probe actuates the sensor with the output signal of the sensor changing to the first state, and,
    further wherein, with the insertion assembly being extended, energizing the motor by the controller to rotate in a second direction translates and retracts the insertion assembly toward the home position with the bottom end of the plunger initially being retracted while the biasing member holds the bottom end of the probe in contact with one of the top of the stack of media and the surface of the media staging area until the distance between the bottom end of the plunger and one of the top of the stack of media in the media staging area and the surface of the media staging area equals the predefined extension distance whereat the top end of the probe ceases to actuate the sensor and causing the output signal of the sensor to change to the second state, and, when the plunger returns to the home position, the stationary actuating member actuates the sensor causing the output signal of the sensor to change to the first state.

2. The stack height sensor assembly of claim 1 wherein the reversible motor is a stepper motor.

3. The stack height sensor assembly of claim 1 wherein the drive mechanism further includes one or more intermediate gears rotatably mounted to the support in operable engagement with the drive gear and the insertion assembly.

4. The stack height sensor assembly of claim 3 wherein the one or more intermediate gears include a compound gear and a second gear, the compound gear having a first gear portion in operable engagement with the drive gear and a second gear portion in operable engagement with the second gear with the second gear also being in operable engagement with the insertion assembly.

5. The stack height sensor assembly of claim 4 wherein the second gear has a keyed center opening and is mounted on a shaft having a correspondingly keyed-shaped cross section, the shaft being rotatably mounted to the support; and the drive mechanism further including a lever having a keyed center opening, mounted to the shaft and radially extending from the shaft and a second biasing member connected between a free end of the lever and the support to form an over-centered arrangement, wherein rotation of the second gear rotates the shaft and lever to move the lever between two stable positions, a first stable position when the insertion assembly is at the home position and a second stable position when the insertion assembly is extended toward one of the top of the stack of media and the surface of the media staging area.

6. The stack height sensor assembly of claim 1 wherein the sensor is an opto-interrupter type sensor.

7. The stack height sensor assembly of claim 1 wherein the sensor is a limit switch.

8. The stack height sensor assembly of claim 1 wherein the bottom of the plunger is mounted in the range of about 10 to about 20 mm from the surface of the media staging area.

9. The stack height sensor assembly of claim 1 wherein each of the probe and the plunger having a roller rotatably mounted to their respective bottom ends.

10. A stack height sensor assembly for determining a media stack height in an image forming device, the stack height sensor assembly comprising:
    a support having a first arm depending therefrom, the first arm having a stationary actuating member, the support mountable adjacent a media staging area in the image forming device;
    a drive assembly mounted on the support and consisting of:
        a reversible motor operably connectable to a controller in the image forming device, the motor having a drive gear on an output shaft thereof;
        a rack gear rotatably mounted to the support and operably engaged with the drive gear; and
        one or more intermediate gears rotatably mounted to the support in operable engagement with the drive gear and the rack gear; and
    an insertion assembly translatably mounted to the support, the insertion assembly having a home position adjacent the first arm, the insertion assembly consisting of:
        a plunger translatably mounted to the support having a top end adjacent the first arm and a bottom end, the plunger having a rack along a side, the rack in operable engagement with the rack gear of the drive assembly;
a single sensor mounted on the top end of the plunger having an output signal that changes to a first state and to a second state when the sensor is actuated and deactuated, respectively, the output signal operably connectable to the controller;
a probe translatably mounted to and aligned with the plunger, the probe having a top end and a bottom end; and
a biasing member connected between the probe and the plunger wherein the probe is biased against the plunger such that a portion of the probe at the bottom end thereof extends a predefined extension distance below the bottom end of the plunger;
wherein, with the stack height assembly installed in the image forming device, the sensor and motor being operably connected to the controller and the insertion assembly in the home position, the stationary member actuates the sensor causing the output signal to be in the first state and energizing the motor by the controller for rotation in a first direction engages the rack gear to translate the rack and extend the insertion assembly away from the home position and the stationary actuating member causing the output signal of the sensor to change to the second state and upon continued extension the bottom of the probe initially contacts one of a top of a stack of media when present in the media staging area and a surface of the media staging area, the plunger and sensor continue to extend until the bottom ends of both the plunger and sensor contact one of the top of the stack of media and the surface of the media staging area at which point the top end of the probe actuates the sensor with the output signal of the sensor changing to the first state and,
further wherein, with the insertion assembly being extended, energizing the motor by the controller for rotation in a second direction rotates the rack gear to translate the rack to retract the insertion assembly toward the home position with the bottom end of the plunger initially being retracted while the biasing member holds the bottom end of the probe in contact with one of the top of the stack of media and the surface of the media staging area until the distance between the bottom end of the plunger and one of the top of the stack of media and the surface of the media staging area equals the predefined extension distance causing the top end of the probe to deactuate the sensor causing the output signal of the sensor to change to the second state, and, when the plunger returns to the home position, the stationary actuating member actuates the sensor causing the output signal of the sensor to change to the first state.

11. The stack height sensor assembly of claim 10 wherein the reversible motor is a stepper motor.

12. The stack height sensor assembly of claim 10 wherein the one or more intermediate gears includes a compound gear, the compound gear having a first gear portion in operable engagement with the drive gear and a second gear portion in operable engagement with the rack gear.

13. The stack height sensor assembly of claim 10 wherein the rack gear has a keyed center opening and is mounted on a shaft having a correspondingly keyed-shaped cross section, the shaft being rotatably mounted to the support; and the drive mechanism further includes a lever having a D-shaped center opening, mounted to the shaft and radially extending from the shaft and a second biasing member connected between a free end of the lever and the support to form an over-centered arrangement, wherein rotation of the rack gear rotates the shaft and lever to move the lever between two stable positions, a first stable position when the insertion assembly is at the home position and a second stable position when the insertion assembly is extended toward one of the top of the stack of media and the surface of the media staging area.

14. The stack height sensor assembly of claim 10 wherein the sensor is an opto-interrupter type sensor.

15. The stack height sensor assembly of claim 10 wherein the sensor is a limit switch.

16. The stack height sensor assembly of claim 10 wherein the bottom of the plunger is mounted in the range of about 10 to about 20 mm from the surface of the media staging area.

17. An image forming device, comprising:
a controller having one of a counter and a timer;
a stapler operably connected to the controller;
a media staging area for holding a media stack to be stapled; and
a stack height sensor assembly for determining a media stack height, the sensor assembly comprising:
a support having a first arm depending therefrom forming a stationary actuating member, the support mounted adjacent to the media staging area;
a drive assembly mounted on the support and consisting of a reversible motor operably connected to the controller, the motor having a drive gear on an output shaft thereof; and,
an insertion assembly translatably mounted to the support, the insertion assembly having a home position adjacent the first arm, the insertion assembly consisting of:
a plunger translatably mounted to the support, the plunger having a top end adjacent the first arm and a bottom end and being in operable engagement with the drive gear;
a sensor mounted on the top end of the plunger, the sensor having an output signal that changes to a first state and to a second state when the sensor is actuated and deactuated, respectively, the sensor and output signal operably connected to the controller for controlling the operation of one of the counter and timer;
a probe translatably mounted to the plunger, the probe having a top end and a bottom end; and
a biasing member connected the probe and to the plunger wherein the probe is biased against the plunger such that a portion of the probe at the bottom end thereof extends a predefined extension distance below the bottom end of the plunger;
wherein, with the insertion assembly in the home position, the stationary member actuates the sensor causing the output signal to be in the first state, and, wherein energizing the motor by the controller for rotation in a first direction translates and extends the insertion assembly away from the home position and the stationary actuating member causing the output signal of the sensor to change to the second state and said change to the second state starting one of the timer and counter, and, on continued extension, when the media stack is present the bottom of the probe initially contacts a top of the media stack, thereafter, the plunger and sensor continue to extend until the bottom ends of both the plunger and probe are in contact with the top of the media stack and the top end of the probe actuates the sensor with the output signal of the sensor changing to the first state with said changing to the first state stopping said one of the counter and timer, and, the controller using one of the counter and time to determine a height of the media stack, and, when the height of the media stack is determined by the controller to be less than a predetermined amount, the controller actuating the stapler to staple the media stack, further wherein, with the insertion assembly being extended, energizing the motor by the controller to rotate in a second direction translates and retracts the insertion assembly toward the home position with the plunger initially being retracted while the biasing member holds the bottom end of the probe in contact with one of the top of the media stack and the surface of the media staging area until the distance between the bottom end of the plunger and the top of the media stack equals the predefined extension distance causing the top end of the probe to deactuate the sensor and causing the output signal of the sensor to change to the second state, and, when the plunger returns to the home position, the stationary actuating member actuates the sensor causing the output signal of the sensor to change to the first state.

18. The image forming device of claim 17 wherein the reversible motor is a stepper motor.

19. The image forming device of claim 17 wherein the drive mechanism further includes one or more intermediate gears rotatably mounted to the support in operable engagement with the drive gear and the insertion assembly, the one or more intermediate gears including a compound gear and a second gear, the compound gear having a first gear portion in operable engagement with the drive gear and a second gear portion in operable engagement with the second gear with the second gear also being in operable engagement with the insertion assembly, the second gear having a keyed center opening and mounted on a shaft having a correspondingly keyed-shaped cross section, the shaft being rotatably mounted to the support; and the drive mechanism further includes a lever having a keyed center opening, mounted to the shaft and radially extending from the shaft and a second biasing member connected between a free end of the lever and the support to form an over-centered arrangement, wherein rotation of the second gear rotates the shaft and lever to move the lever between two stable positions, a first stable position when the insertion assembly is at the home position and a second stable position when the insertion assembly is extended toward one of the top of the stack of media and the surface of the media staging area.

20. The image forming device of claim 17 wherein the sensor is an opto-interrupter type sensor.

21. The image forming device of claim 17 wherein the controller varies a stapling force of the stapler based on the height of the media stack.

* * * * *